(12) United States Patent
Wei et al.

(10) Patent No.: US 11,708,036 B2
(45) Date of Patent: Jul. 25, 2023

(54) COMPOSITE ARTICLES INCLUDING TEXTURED FILMS AND RECREATIONAL VEHICLE ARTICLES INCLUDING THEM

(71) Applicant: Hanwha Azdel, Inc., Forest, VA (US)

(72) Inventors: Liqing Wei, Forest, VA (US); Mark O. Mason, Covington, VA (US)

(73) Assignee: Hanwha Azdel, Inc., Forest, VA (US)

( * ) Notice: Subject to any disclaimer, the term of this patent is extended or adjusted under 35 U.S.C. 154(b) by 0 days.

(21) Appl. No.: 17/479,425

(22) Filed: Sep. 20, 2021

(65) Prior Publication Data

US 2022/0258678 A1 Aug. 18, 2022

Related U.S. Application Data

(63) Continuation of application No. 16/433,235, filed on Jun. 6, 2019, now Pat. No. 11,124,134.

(60) Provisional application No. 62/681,605, filed on Jun. 6, 2018.

(51) Int. Cl.
*B60R 13/02* (2006.01)
*B32B 7/12* (2006.01)
*B32B 27/12* (2006.01)
*B32B 27/32* (2006.01)

(52) U.S. Cl.
CPC ............... *B60R 13/02* (2013.01); *B32B 7/12* (2013.01); *B32B 27/12* (2013.01); *B32B 27/32* (2013.01); *B32B 2262/101* (2013.01); *B32B 2307/3065* (2013.01); *B32B 2307/538* (2013.01); *B32B 2307/718* (2013.01); *B32B 2605/003* (2013.01)

(58) Field of Classification Search
CPC ........ B32B 2260/023; B32B 2260/021; B32B 2605/003; B32B 2307/538; B60R 13/02
USPC .......................... 296/156, 164, 168, 191, 39.1
See application file for complete search history.

*Primary Examiner* — Dennis H Pedder
(74) *Attorney, Agent, or Firm* — Rhodes IP PLC; Christopher Rhodes

(57) ABSTRACT

A thermoplastic composite article comprising a porous core layer and a textured film disposed on a first surface of the porous core layer is described. The composite article can be configured as a recreational vehicle building substrate such as a ceiling or interior wall panel.

5 Claims, 12 Drawing Sheets

COMPOSITE ARTICLES INCLUDING TEXTURED FILMS AND RECREATIONAL VEHICLE ARTICLES INCLUDING THEM

PRIORITY APPLICATION

This application is a continuation application of U.S. application Ser. No. 16/433,235 filed on Jun. 6, 2019. U.S. application Ser. No. 16/433,235 claims priority to and the benefit of U.S. Provisional Application No. 62/681,605 filed on Jun. 6, 2018, the entire disclosure of which is hereby incorporated herein by reference.

TECHNOLOGICAL FIELD

Certain examples described herein are directed to composite articles that comprises a textured film on one or more surfaces. More particularly, certain examples described herein are directed to recreational vehicle panels that comprise one or more textured films.

BACKGROUND

Composite materials have broad applications in different industries, such as building and construction, automotive, and recreational vehicles. To be used in these industries, the composite materials often need to have certain physical characteristics.

SUMMARY

Certain aspects, embodiments, configurations and examples of lightweight reinforced thermoplastic (LWRT) composite articles that comprise a textured film on one or more surfaces. In some configurations, the composite article may comprise a multi-layer film where at least one of the film layers comprises a texture.

In one aspect, a recreational vehicle interior panel comprises a core layer comprising a front surface and a back surface, the core layer comprising a web of reinforcing fibers held together by a thermoplastic material, and a multi-layer film disposed on the front surface of the core layer, wherein a textured film layer of the multi-layer film is positioned on an interior surface of the front surface toward an interior volume of the recreational vehicle. The core layer may be porous to reduce weight and/or permit air or gases to travel through the core layer.

In some configurations, the core layer comprises 20% to 80% by weight reinforcing fibers and 20% to 80% by weight thermoplastic material. In other examples, the reinforcing fibers comprises glass fibers and the thermoplastic material comprises a polyolefin. In some examples, the multi-layer film comprises a polyolefin film layer under the textured film layer. In other examples, the interior surface of the recreational vehicle interior panel comprises a surface roughness less than 12 microns in the machine direction and less than 15 microns in the cross direction as tested using a stylus profilometer. In some embodiments, the interior surface of the recreational vehicle interior panel comprises a RMS roughness less than of 15 microns in the machine direction and less than 15 microns in the cross direction. In other examples, the interior surface of the recreational vehicle interior panel comprises a maximum roughness of less than 90 microns in the machine direction and less than 120 microns in the cross direction. In some embodiments, the interior surface of the recreational vehicle interior panel comprises a surface roughness less than 8 microns in the machine direction and less than 8 microns in the cross direction as tested using a stylus profilometer, a RMS roughness less than 10 microns in the machine direction and less than 9 microns in the cross direction and a maximum roughness less than 55 microns in the machine direction and 50 microns in the cross direction. In other examples, a thickness of the multilayer film is between 0.1 mm and 0.2 mm. In some examples, the multilayer film comprises a tie layer between the textured film layer and an adhesive layer.

In other examples, the core layer comprises a scrim disposed on the back surface. In some examples, the interior panel comprises a basis weight of less than 1600 grams per square meter (gsm). In further examples, the interior panel comprises a thickness of less than 4 mm. In certain examples, the core layer comprises reinforcing glass fibers and polypropylene thermoplastic material. In some embodiments, the core layer comprises an inorganic flame retardant material. In some examples, the multi-layer film comprises a tie layer between the textured film layer and an underlying layer. In other examples, the underlying layer comprises an adhesive, and wherein the textured film layer comprises a polyolefin and a filler. In some embodiments, the adhesive comprises a hot-melt adhesive with a melting temperature of 90-150 degrees C.

In other examples, the interior panel is cellulose free.

In some examples, the core layer comprises glass reinforcing fibers and polypropylene thermoplastic material, the multi-layer film comprises the textured film layer, a tie layer and an adhesive layer, wherein the textured film layer comprises a polyolefin and filler, and wherein the interior panel comprises a scrim disposed on the back surface of the core layer.

In another aspect, a recreational vehicle ceiling tile comprises a core layer comprising a front surface and a back surface, the core layer comprising a web of reinforcing fibers held together by a thermoplastic material, and a multi-layer film disposed on the front surface of the core layer, wherein a textured film layer of the multi-layer film is positioned on an interior surface of the front surface toward an interior volume of the recreational vehicle, and wherein the multi-layer film further comprises an adhesive layer positioned on the front surface and a tie layer between the textured film layer and the adhesive layer. The core layer may be porous to reduce weight and/or permit air or gases to travel through the core layer.

In certain examples, the core layer comprises 20% to 80% by weight reinforcing fibers and 20% to 80% by weight thermoplastic material. In other examples, the reinforcing fibers comprises glass fibers and the thermoplastic material comprises a polyolefin. In some embodiments, the multi-layer film comprises a polyolefin film layer under the textured film layer. In other embodiments, the interior surface of the recreational vehicle interior panel comprises a surface roughness less than 12 microns in the machine direction and less than 15 microns in the cross direction as tested using a stylus profilometer. In some examples, the interior surface of the recreational vehicle interior panel comprises a RMS roughness less than of 15 microns in the machine direction and less than 15 microns in the cross direction. In other examples, the interior surface of the recreational vehicle interior panel comprises a maximum roughness of less than 90 microns in the machine direction and less than 120 microns in the cross direction. In some instances, the interior surface of the recreational vehicle interior panel comprises a surface roughness less than 8 microns in the machine direction and less than 8 microns in the cross direction as tested using a stylus profilometer, a RMS roughness less than 10 microns in the machine direction and less than 9 microns in the cross direction and a maximum roughness less than 55 microns in the machine direction and 50 microns in the cross direction. In some embodiments, a thickness of the multilayer film is between 0.1 mm and 0.2 mm.

In certain examples, the core layer of the recreational vehicle ceiling tile comprises a scrim disposed on the back surface. In some examples, the core layer comprises reinforcing glass fibers and polypropylene thermoplastic material. In some examples, the core layer comprises an inorganic flame retardant material. In other examples, the textured film layer comprises a polyolefin and a filler. In some embodiments, the adhesive comprises a hot-melt adhesive with a melting temperature of 90-150 degrees C. In other examples, the ceiling tile is cellulose free.

In another aspect, an interior automotive panel configured to couple to an interior side of an automotive chassis is described. For example, the interior automotive panel comprises a core layer comprising a web of reinforcing fibers held together by a thermoplastic material, the panel further comprising a textured multi-layer film disposed on the core layer, wherein a textured layer of the textured multi-layer film is positioned toward an interior surface, and wherein the textured multi-layer film reduces a surface roughness of the interior automotive panel compared to a surface roughness in an absence of the textured multi-layer film.

Additional aspects, configurations, embodiments, examples and features are described in more detail below.

BRIEF DESCRIPTION OF THE SEVERAL VIEWS OF THE DRAWINGS

Certain illustrative configurations of composite articles are described with reference to the figures in which.

Figure 1A:
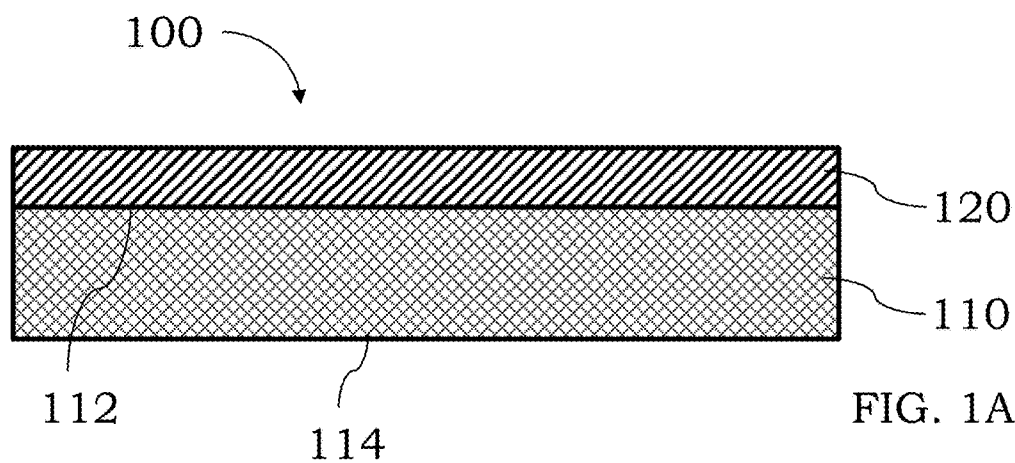
FIG. 1A is an illustration of a composite article comprising a prepreg or core layer coupled to a textured film layer on one surface, in accordance with certain configurations.

It will be recognized by the person of ordinary skill in the art, given the benefit of this disclosure, that the illustrative representations shown in the figures are provided for convenience and to facilitate a better understanding. The exact shape, length, width, thickness, geometry and overall orientation of the components in the figures may vary depending on the intended use and desired properties.

DETAILED DESCRIPTION

Examples of some configurations of composite articles are described that may comprise two or more layers coupled to each other. While various layers are shown in the figures and are described below, the thickness, size and geometry of the different layers need not be the same and may be other thicknesses, size and geometries than those shown in the figures. Further, the exact arrangement or layering of the components can be altered or intermediate layers may be present between the illustrative layers shown in the figures. Where a multi-layer film is described, the film may comprise two, three or more layers any of which may be textured or non-textured. In some instances, an outermost layer of a multi-layer film comprises a textured film layer and the other layers of the multi-layer film may or may not comprise a textured film layer.

In certain embodiments, the articles described herein generally comprise a prepreg or core layer coupled to another layer. A prepreg can be a non-fully formed core layer and may comprise materials that are processed to form a final core layer. For example, the prepreg may comprise thermoplastic materials in combination with reinforcing fibers but may not be fully formed or may be present in a softened state by application of heat. The prepreg may be pressed, compressed or molded into a desired shape to provide a core layer. The other layers coupled to the prepreg layer may be added prior to fully forming the core or after fully forming the core. The other layers can be coupled to the prepreg or core layer using an adhesive or, in some instances, the prepreg or core layer may be directly coupled to other layers without the use of any adhesive material between the prepreg or core layer and the other layers.

In certain examples, the prepregs or core layers can be used in a lightweight reinforced thermoplastic (LWRT) article. LWRT's can provide certain desirable attributes including, but not limited to, high stiffness-to-weight ratio, low part weight, simple and low-cost part forming process, low coefficient of thermal expansion, recyclability, and others. LWRT's have broad applications in the automotive industry, including different kinds of soft trims for both interior and exterior applications. Recreational vehicles, commercial truck trailers, and similar applications represent another category of the broad applications of LWRT articles. Finished furniture, unfinished furniture, furniture chassis, ceiling tiles, office panels, cubicle panels and building and construction industries may also use or include the LWRT articles described herein.

In certain examples and referring to FIG. 1A, a composite article 100 is shown that comprises a prepreg or core layer 110 and a film layer 120 disposed on a surface 112 of the prepreg or core layer 110. In certain examples, the prepreg or core layer 110 may comprise a thermoplastic material and reinforcing fibers, which can be held in place in the general form of a web by the thermoplastic material. The fibers can be generally arranged in a random fashion without any specific orientation or configurations. In certain examples, the thermoplastic material of the prepreg or core layer 110 may be present in fiber form, particle form, resin form or other suitable forms. In certain embodiments, the prepreg or core layer 110 generally comprises a substantial amount of open cell structure such that void space is present in the prepreg or core layer 110. For example, the prepreg or core layer 110 may comprise a void content or porosity of 0-30%, 10-40%, 20-50%, 30-60%, 40-70%, 50-80%, 60-90%, 0-40%,0-50%,0-60%,0-70%,0-80%,0-90%, 10-50%, 10-60%, 10-70%, 10-80%, 10-90%, 10-95%, 20-60%, 20-70%, 20-80%, 20-90%, 20-95%, 30-70%, 30-80%, 30-90%, 30-95%, 40-80%, 40-90%, 40-95%, 50-90%, 50-95%, 60-95% 70-80%, 70-90%, 70-95%, 80-90%, 80-95% or any illustrative value within these exemplary ranges. In some instances, the prepreg or core layer 110 comprises a porosity or void content of greater than 0%, e.g., is not fully consolidated, up to about 95%. Unless otherwise stated, the reference to the prepreg or core layer comprising a certain void content or porosity is based on the total volume of the prepreg or core layer and not necessarily the total volume of the prepreg or core layer plus any other materials or layers coupled to the prepreg or core layer.

In certain embodiments, the thermoplastic material of the prepreg or core layer 110 may comprise, at least in part, one or more of polyethylene, polypropylene, polystyrene, acrylonitrylstyrene, butadiene, polyethyleneterephthalate, polybutyleneterephthalate, polybutylenetetrachlorate, and polyvinyl chloride, both plasticized and unplasticized, and blends of these materials with each other or other polymeric materials. Other suitable thermoplastics include, but are not limited to, polyarylene ethers, polycarbonates, polyestercarbonates, thermoplastic polyesters, polyimides, polyetherimides, polyamides, acrylonitrile-butylacrylate-styrene polymers, amorphous nylon, polyarylene ether ketone, polyphenylene sulfide, polyaryl sulfone, polyether sulfone, liquid crystalline polymers, poly(1,4 phenylene) compounds commercially known as PARMAX®, high heat polycarbonate such as Bayer's APEC® PC, high temperature nylon, and silicones, as well as alloys and blends of these materials with each other or other polymeric materials. The virgin thermoplastic material used to form the prepreg or core layer 110 can be used in powder form, resin form, rosin form, fiber form or other suitable forms. Illustrative thermoplastic materials in various forms are described herein and are also described, for example in U.S. Publication Nos. 20130244528 and US20120065283. The exact amount of thermoplastic material present in the prepreg or core layer 110 can vary and illustrative amounts range from about 20% by weight to about 80% by weight.

In certain examples, the reinforcing fibers of the prepreg or core layer 110 described herein can comprise glass fibers, carbon fibers, graphite fibers, synthetic organic fibers, particularly high modulus organic fibers such as, for example, para- and meta-aramid fibers, nylon fibers, polyester fibers, or any high melt flow index resins that are suitable for use as fibers, natural fibers such as hemp, sisal, jute, flax, coir, kenaf and cellulosic fibers, mineral fibers such as basalt, mineral wool (e.g., rock or slag wool), wollastonite, alumina silica, and the like, or mixtures thereof, metal fibers, metalized natural and/or synthetic fibers, ceramic fibers, yarn fibers, or mixtures thereof. In some instances, one type of the reinforcing fibers may be used along with mineral fibers such as, for example, fibers formed by spinning or drawing molten minerals. Illustrative mineral fibers include, but are not limited to, mineral wool fibers, glass wool fibers, stone wool fibers, and ceramic wool fibers. In some embodiments, any of the aforementioned fibers can be chemically treated prior to use to provide desired functional groups or to impart other physical properties to the fibers. The total fiber content in the prepreg or core layer 110 may be from about 20% to about 90% by weight of the prepreg, more particularly from about 30% to about 70%, by weight of the prepreg. Typically, the fiber content of a composite article comprising the prepreg or core layer 110 varies between about 20% to about 90% by weight, more particularly about 30% by weight to about 80% by weight, e.g., about 40% to about 70% by weight of the composite. The particular size and/or orientation of the fibers used may depend, at least in part, on the polymer material used and/or the desired properties of the resulting prepreg. Suitable additional types of fibers, fiber sizes and amounts will be readily selected by the person of ordinary skill in the art, given the benefit of this disclosure. In one non-limiting illustration, fibers dispersed within a thermoplastic material to provide a prepreg or core layer generally have a diameter of greater than about 5 microns, more particularly from about 5 microns to about 22 microns, and a length of from about 5 mm to about 200 mm. More particularly, the fiber diameter may be from about microns to about 22 microns and the fiber length may be from about 5 mm to about 75 mm. In some configurations, the flame retardant material may be present in fiber form. For example, the prepreg or core layer 110 may comprise a thermoplastic material, reinforcing fibers and fibers comprising a flame retardant material, e.g., fibers comprising an EG material or an inorganic flame retardant material. The flame retardant fibers may comprise any one or more of the flame retardant materials described herein, e.g., polypropylene fibers compounded with a hydroxide material which is then extruded and cut into fibers using a suitable die or other devices, or EG materials mixed with polypropylene fibers compounded with a hydroxide material which is then extruded and cut into fibers using a suitable die or other devices.

In some configurations, the prepreg or core layer 110 may be a substantially halogen free or halogen free prepreg to meet the restrictions on hazardous substances requirements for certain applications. In other instances, the prepreg may comprise a halogenated flame retardant agent (which can be present in the flame retardant material or may be added in addition to the flame retardant material) such as, for example, a halogenated flame retardant that comprises one of more of F, Cl, Br, I, and At or compounds that including such halogens, e.g., tetrabromo bisphenol-A polycarbonate or monohalo-, dihalo-, trihalo- or tetrahalo-polycarbonates. In some instances, the thermoplastic material used in the prepregs and cores may comprise one or more halogens to impart some flame retardancy without the addition of another flame retardant agent. For example, the thermoplastic material may be halogenated in addition to there being a flame retardant material present, or the virgin thermoplastic material may be halogenated and used by itself. Where halogenated flame retardants are present, the flame retardant is desirably present in a flame retardant amount, which can vary depending on the other components which are present. For example, the halogenated flame retardant where present in addition to the flame retardant material may be present in about 0.1 weight percent to about 40 weight percent (based on the weight of the prepreg), more particularly about 0.1 weight percent to about 15 weight percent, e.g., about 5 weight percent to about 15 weight percent. If desired, two different halogenated flame retardants may be added to the prepregs. In other instances, a non-halogenated flame retardant agent such as, for example, a flame retardant agent comprising one or more of N, P, As, Sb, Bi, S, Se, and Te can be added. In some embodiments, the non-halogenated flame retardant may comprise a phosphorated material so the prepregs or core layers may be more environmentally friendly. Where non-halogenated or substantially halogen free flame retardants are present, the flame retardant is desirably present in a flame retardant amount, which can vary depending on the other components which are present. For example, the substantially halogen free flame retardant may be present in about 0.1 weight percent to about 40 weight percent (based on the weight of the prepreg), more particularly about 5 weight percent to about 40 weight percent, e.g., about 5 weight percent to about 15 weight percent based on the weight of the prepreg. If desired, two different substantially halogen free flame retardants may be added to the prepregs. In certain instances, the prepregs described herein may comprise one or more halogenated flame retardants in combination with one or more substantially halogen free flame retardants. Where two different flame retardants are present, the combination of the two flame retardants may be present in a flame retardant amount, which can vary depending on the other components which are present. For example, the total weight of flame retardants present may be about 0.1 weight percent to about 40 weight percent (based on the weight of the prepreg or core), more particularly about 5 weight percent to about 40 weight percent, e.g., about 2 weight percent to about 14 weight percent based on the weight of the prepreg or core. The flame retardant agents used in the prepregs or cores described herein can be added to the mixture comprising the thermoplastic material and fibers (prior to disposal of the mixture on a wire screen or other processing component) or can be added after the prepreg or core is formed.

In certain examples, the film layer 120 can be coupled directly to the prepreg or core layer 110 or an adhesive layer can be present between the prepreg or core layer 110 and the film layer 120 or the film layer 120 itself may comprise an adhesive layer or a layer which can function to adhere other layers of the film layer 120 to the prepreg or core layer 110. Various specific configurations of film layers that can be used are discussed in more detail below. In general, the film layer comprises one or more polymeric layers that can provide desirable physical characteristics to the overall article. For example, the film layer 120 can be selected such that it smooths out the article by hiding the rough surface of the prepreg or core layer 110. In other instances, the film layer 120 may provide a texture to the article such that a certain surface roughness is present. In yet other instances, the film layer may hide or mask the underlying roughness of the prepreg or core layer 110 while at the same time providing a desired texture or feel to the composite article including the film layer 120. In certain examples, the rough nature of the prepreg or core layer 110 can be used in combination with the film layer 120 to provide a textured or non-smooth surface.

In certain embodiments, where the film layer 120 comprises a single layer, the single layer of the film layer 120 provides some texture on an outer surface of the film layer. Each side of the film layer 120 need not be textured. For example, a side of the film layer 120 facing the prepreg or core layer 110 and disposed on the surface 112 can be smooth, rough, textured, or may have other physical characteristics. A side of the film layer 120 facing away from the surface 112 may provide some texture to the overall article that includes the film layer 120. While various materials can be present in the film layer 120, the film layer 120 typically comprises one or more thermoplastic materials. For example, certain layers of the film may comprise those materials described in US20170217121.

Figure 1B:
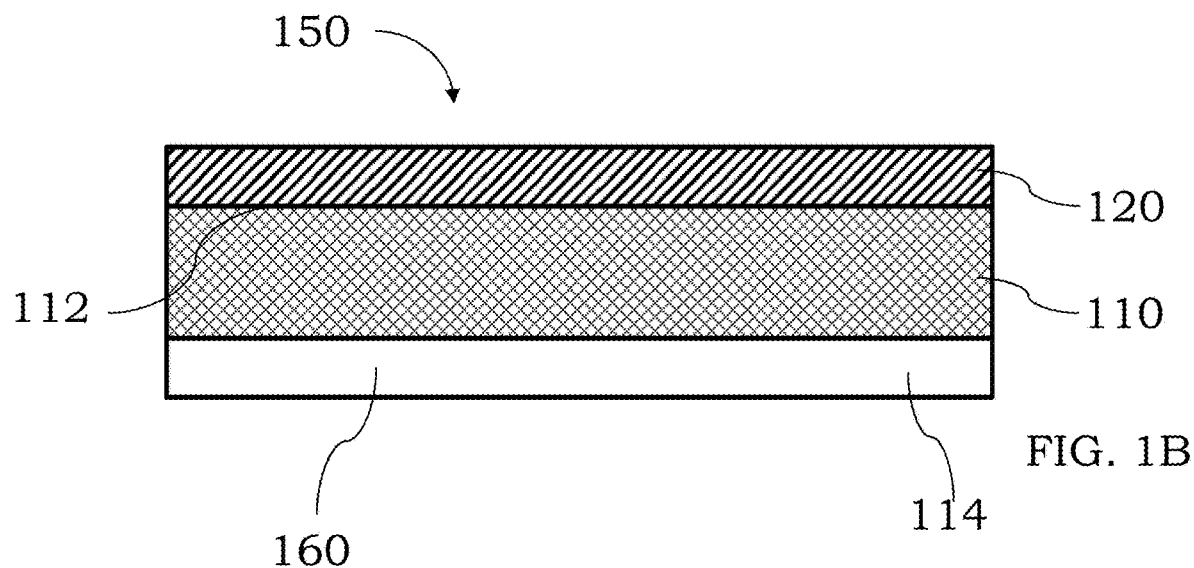
FIG. 1B is an illustration of a composite article comprising a prepreg or core layer coupled to a textured film layer on one surface and a skin layer on another surface, in accordance with certain configurations.

In some configurations, the composite article may comprise an additional layer disposed on another surface of the prepreg or core layer 110. Referring to FIG. 1B, a skin layer 160 is shown as being disposed on a surface 114 of the prepreg or core layer 110. If desired, the skin layer 160 may be the same as the film layer 120 or may be different. For example, the layer 160 may comprise, for example, a scrim (e.g., fiber based scrim), a foil, a woven fabric, a non-woven fabric or be present as an inorganic coating, an organic coating, or a thermoset coating disposed on the prepreg or core layer 110. In other instances, the layer 160 may comprise a limiting oxygen index greater than about 22, as measured per ISO 4589 dated 1996. Where a fiber based scrim is present as (or as part of) the layer 160, the fiber based scrim may comprise at least one of glass fibers, aramid fibers, graphite fibers, carbon fibers, inorganic mineral fibers, metal fibers, metalized synthetic fibers, and metalized inorganic fibers. Where a thermoset coating is present as (or as part of) the layer 160, the coating may comprise at least one of unsaturated polyurethanes, vinyl esters, phenolics and epoxies. Where an inorganic coating is present as (or as part of) the layer 160, the inorganic coating may comprise minerals containing cations selected from Ca, Mg, Ba, Si, Zn, Ti and Al or may comprise at least one of gypsum, calcium carbonate and mortar. Where a non-woven fabric is present as (or as part of) the layer 160, the non-woven fabric may comprise a thermoplastic material, a thermal setting binder, inorganic fibers, metal fibers, metallized inorganic fibers and metallized synthetic fibers. The thickness of the layers 120, 160 may be the same or may be different. If desired, an intermediate layer (not shown) can be present between the layer 110 and the layer 120 or between the layer 110 and the layer 160.

Figure 1C:
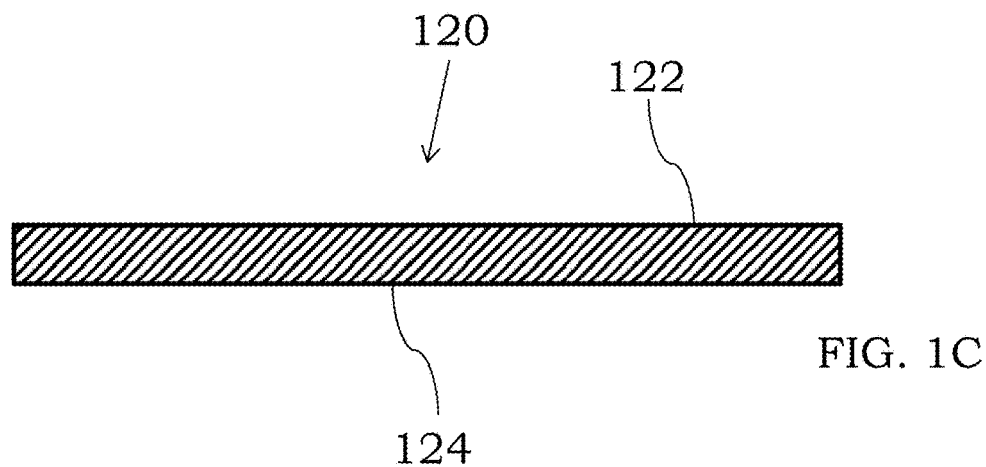
FIG. 1C shows a film layer.

In certain embodiments and referring to FIG. 1C, the film layer 120 may comprise one or more thermoplastic materials and a texture present on a surface 122 of the film layer 120. The surface 124 can be textured, smooth or may have textured areas and smooth areas. The texture on the surface 122 need not be the same or uniform across the entire surface. For example, projections or depressions in the surface 122 to provide the texture may have different sizes and/or depths. In some examples, the film layer 120 may comprise one or more thermoplastic materials including, but not limited to, polyethylene, polypropylene, polystyrene, acrylonitrylstyrene, butadiene, polyethyleneterephthalate, polybutyleneterephthalate, polybutylenetetrachlorate, polyvinyl chloride, both plasticized and unplasticized, and blends of these materials with each other or other polymeric materials. Other suitable thermoplastic materials that can be present in the film layer 120 include, but are not limited to, polyarylene ethers, polycarbonates, polyestercarbonates, thermoplastic polyesters, polyimides, polyetherimides, polyamides, acrylonitrile-butylacrylate-styrene polymers, amorphous nylon, polyarylene ether ketone, polyphenylene sulfide, polyaryl sulfone, polyether sulfone, liquid crystalline polymers, poly(1,4 phenylene) compounds commercially known as PARMAX®, high heat polycarbonate such as Bayer's APEC® PC, high temperature nylon, and silicones, as well as alloys and blends of these materials with each other or other polymeric materials. In some examples, the film layer may comprise one or more polyolefin materials which can be present as homopolymers, co-polymers, polymer blends, etc. The film layer can be extruded or co-extruded into layers, and a pattern or other features can be embossed, pressed into or otherwise formed in the surface 122 of the film layer 120. For example, the surface 122 can be subjected to physical processes such as sand-blasting, powder coating, sanding, etching, etc. to impart a texture to the surface 122. The surface may comprise projections or depressions or both to impart some texture to the surface. If desired, an adhesive layer (not shown) can be used with the film layer 120 to couple the film layer 120 to an underlying core layer or other layer. In some embodiments, the film layer 120 may comprise a polyurethane material or the layer 120 can be used with a polyurethane adhesive material. The film layer 120 may comprise additives such as colorants or fillers such as fibers, particles, etc. if desired.

Figure 2A:
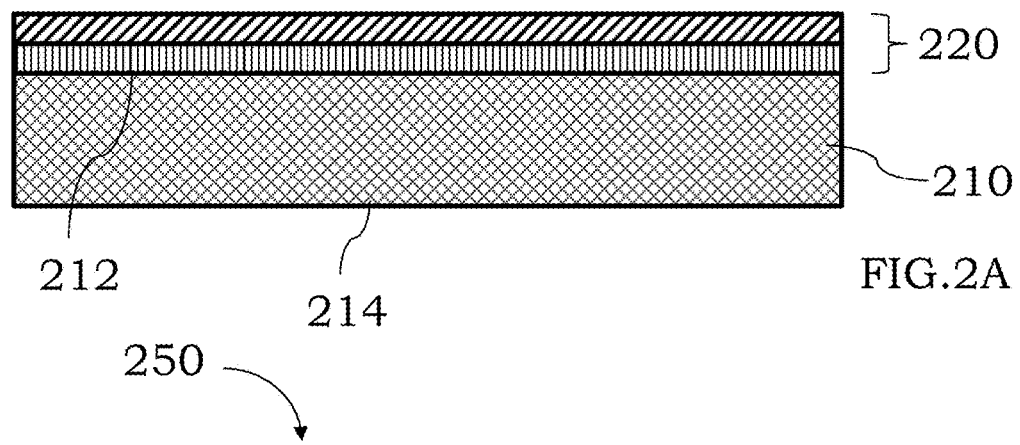
FIG. 2A is an illustration of a composite article comprising a prepreg or core layer coupled to a textured bi-layer film on one surface, in accordance with certain embodiments.

In certain examples and referring to FIG. 2A, a composite article 200 is shown that comprises a prepreg or core layer 210 and a bi-layer film 220 disposed on a surface 212 of the prepreg or core layer 210. In certain examples, the prepreg or core layer 210 may comprise any of those materials and configurations discussed in reference to the prepreg or core layer 110. For example, the prepreg or core layer 210 may comprise a thermoplastic material and reinforcing fibers, which can be held in place in the general form of a web by the thermoplastic material. The fibers can be generally arranged in a random fashion without any specific orientation or configurations. In certain examples, the thermoplastic material of the prepreg or core layer 210 may be present in fiber form, particle form, resin form or other suitable forms. In certain embodiments, the prepreg or core layer 210 generally comprises a substantial amount of open cell structure such that void space is present in the prepreg or core layer 210. For example, the prepreg or core layer 210 may comprise a void content or porosity of 0-30%, 10-40%, 20-50%, 30-60%, 40-70%, 50-80%, 60-90%, 0-40%, 0-50%, 0-60%, 0-70%, 0-80%, 0-90%, 10-50%, 10-60%, 10-70%, 10-80%, 10-90%, 10-95%, 20-60%, 20-70%, 20-80%, 20-90%, 20-95%, 30-70%, 30-80%, 30-90%, 30-95%, 40-80%, 40-90%, 40-95%, 50-90%, 50-95%, 60-95% 70-80%, 70-90%, 70-95%, 80-90%, 80-95% or any illustrative value within these exemplary ranges. In some instances, the prepreg or core layer 210 comprises a porosity or void content of greater than 0%, e.g., is not fully consolidated, up to about 95%. Unless otherwise stated, the reference to the prepreg or core layer 210 comprising a certain void content or porosity is based on the total volume of the prepreg or core layer 210 and not necessarily the total volume of the prepreg or core layer 210 plus any other materials or layers coupled to the prepreg or core layer 210.

In certain embodiments, the thermoplastic material of the prepreg or core layer 210 may comprise, at least in part, one or more of polyethylene, polypropylene, polystyrene, acrylonitrylstyrene, butadiene, polyethyleneterephthalate, polybutyleneterephthalate, polybutylenetetrachlorate, and polyvinyl chloride, both plasticized and unplasticized, and blends of these materials with each other or other polymeric materials. Other suitable thermoplastics include, but are not limited to, polyarylene ethers, polycarbonates, polyestercarbonates, thermoplastic polyesters, polyimides, polyetherimides, polyamides, acrylonitrile-butylacrylate-styrene polymers, amorphous nylon, polyarylene ether ketone, polyphenylene sulfide, polyaryl sulfone, polyether sulfone, liquid crystalline polymers, poly(1,4 phenylene) compounds commercially known as PARMAX®, high heat polycarbonate such as Bayer's APEC® PC, high temperature nylon, and silicones, as well as alloys and blends of these materials with each other or other polymeric materials. The virgin thermoplastic material used to form the prepreg or core layer 210 can be used in powder form, resin form, rosin form, fiber form or other suitable forms. Illustrative thermoplastic materials in various forms are described herein and are also described, for example in U.S. Publication Nos. 20130244528 and US20120065283. The exact amount of thermoplastic material present in the prepreg or core layer 210 can vary and illustrative amounts range from about 20% by weight to about 80% by weight.

In certain examples, the reinforcing fibers of the prepreg or core layer 210 described herein can comprise glass fibers, carbon fibers, graphite fibers, synthetic organic fibers, particularly high modulus organic fibers such as, for example, para- and meta-aramid fibers, nylon fibers, polyester fibers, or any high melt flow index resins that are suitable for use as fibers, natural fibers such as hemp, sisal, jute, flax, coir, kenaf and cellulosic fibers, mineral fibers such as basalt, mineral wool (e.g., rock or slag wool), wollastonite, alumina silica, and the like, or mixtures thereof, metal fibers, metalized natural and/or synthetic fibers, ceramic fibers, yarn fibers, or mixtures thereof. In some instances, one type of the reinforcing fibers may be used along with mineral fibers such as, for example, fibers formed by spinning or drawing molten minerals. Illustrative mineral fibers include, but are not limited to, mineral wool fibers, glass wool fibers, stone wool fibers, and ceramic wool fibers. In some embodiments, any of the aforementioned fibers can be chemically treated prior to use to provide desired functional groups or to impart other physical properties to the fibers. The total fiber content in the prepreg or core layer 210 may be from about 20% to about 90% by weight of the prepreg, more particularly from about 30% to about 70%, by weight of the prepreg. Typically, the fiber content of a composite article comprising the prepreg or core layer 210 varies between about 20% to about 90% by weight, more particularly about 30% by weight to about 80% by weight, e.g., about 40% to about 70% by weight of the composite. The particular size and/or orientation of the fibers used may depend, at least in part, on the polymer material used and/or the desired properties of the resulting prepreg. Suitable additional types of fibers, fiber sizes and amounts will be readily selected by the person of ordinary skill in the art, given the benefit of this disclosure. In one non-limiting illustration, fibers dispersed within a thermoplastic material to provide a prepreg or core layer generally have a diameter of greater than about 5 microns, more particularly from about 5 microns to about 22 microns, and a length of from about 5 mm to about 200 mm. More particularly, the fiber diameter may be from about microns to about 22 microns and the fiber length may be from about 5 mm to about 75 mm. In some configurations, the flame retardant material may be present in fiber form. For example, the prepreg or core layer 210 may comprise a thermoplastic material, reinforcing fibers and fibers comprising a flame retardant material, e.g., fibers comprising an EG material or an inorganic flame retardant material. The flame retardant fibers may comprise any one or more of the flame retardant materials described herein, e.g., polypropylene fibers compounded with a hydroxide material which is then extruded and cut into fibers using a suitable die or other devices, or EG materials mixed with polypropylene fibers compounded with a hydroxide material which is then extruded and cut into fibers using a suitable die or other devices.

In some configurations, the prepreg or core layer 210 may be a substantially halogen free or halogen free prepreg to meet the restrictions on hazardous substances requirements for certain applications. In other instances, the prepreg may comprise a halogenated flame retardant agent (which can be present in the flame retardant material or may be added in addition to the flame retardant material) such as, for example, a halogenated flame retardant that comprises one of more of F, Cl, Br, I, and At or compounds that including such halogens, e.g., tetrabromo bisphenol-A polycarbonate or monohalo-, dihalo-, trihalo- or tetrahalo-polycarbonates. In some instances, the thermoplastic material used in the prepregs and cores may comprise one or more halogens to impart some flame retardancy without the addition of another flame retardant agent. For example, the thermoplastic material may be halogenated in addition to there being a flame retardant material present, or the virgin thermoplastic material may be halogenated and used by itself. Where halogenated flame retardants are present, the flame retardant is desirably present in a flame retardant amount, which can vary depending on the other components which are present. For example, the halogenated flame retardant where present in addition to the flame retardant material may be present in about 0.1 weight percent to about 15 weight percent (based on the weight of the prepreg), more particularly about 1 weight percent to about 13 weight percent, e.g., about 5 weight percent to about 13 weight percent. If desired, two different halogenated flame retardants may be added to the prepregs. In other instances, a non-halogenated flame retardant agent such as, for example, a flame retardant agent comprising one or more of N, P, As, Sb, Bi, S, Se, and Te can be added. In some embodiments, the non-halogenated flame retardant may comprise a phosphorated material so the prepregs or core layers may be more environmentally friendly. Where non-halogenated or substantially halogen free flame retardants are present, the flame retardant is desirably present in a flame retardant amount, which can vary depending on the other components which are present. For example, the substantially halogen free flame retardant may be present in about 0.1 weight percent to about 40 weight percent (based on the weight of the prepreg), more particularly about 5 weight percent to about 40 weight percent, e.g., about 5 weight percent to about 15 weight percent based on the weight of the prepreg. If desired, two different substantially halogen free flame retardants may be added to the prepregs. In certain instances, the prepregs described herein may comprise one or more halogenated flame retardants in combination with one or more substantially halogen free flame retardants. Where two different flame retardants are present, the combination of the two flame retardants may be present in a flame retardant amount, which can vary depending on the other components which are present. For example, the total weight of flame retardants present may be about 0.1 weight percent to about 40 weight percent (based on the weight of the prepreg or core), more particularly about 5 weight percent to about 40 weight percent, e.g., about 2 weight percent to about 15 weight percent based on the weight of the prepreg or core. The flame retardant agents used in the prepregs or cores described herein can be added to the mixture comprising the thermoplastic material and fibers (prior to disposal of the mixture on a wire screen or other processing component) or can be added after the prepreg or core is formed.

In certain examples, the bi-layer film 220 can be coupled directly to the prepreg or core layer 210 or an adhesive layer can be present between the prepreg or core layer 210 and the bi-layer film 220 or one of the layer of the bi-layer film 220 itself may comprise an adhesive layer or a layer which can function to adhere other layers of the bi-layer film 220 to the prepreg or core layer 210. In general, the bi-layer film 220 comprises one or more polymeric layers that can provide desirable physical characteristics to the overall article. For example, the bi-layer film 220 can be selected such that it smooths out the article by hiding the rough surface of the prepreg or core layer 210. In other instances, the bi-layer film 220 may provide a texture to the article such that a certain surface roughness is present. In yet other instances, the bi-layer film 220 may hide or mask the underlying roughness of the prepreg or core layer 210 while at the same time providing a desired texture or feel to the composite article including the bi-layer film 220. In certain examples, the rough nature of the prepreg or core layer 210 can be used in combination with the bi-layer film 220 to provide a textured or non-smooth surface.

In certain embodiments, the bi-layer film 220 can provide some texture on an outer surface of the film 220. Each side of the film 220 need not be textured. For example, a side of the film 220 facing the prepreg or core layer 210 and disposed on the surface 212 can be smooth, rough, textured, or may have other physical characteristics. A side of the film 220 facing away from the surface 212 may provide some texture to the overall article that includes the film 220. While various materials can be present in the film 220, the film 220 typically comprises one or more thermoplastic materials. For example, certain layers of the film may comprise those materials described in US20170217121. In some examples, at least one layer of the bi-layer film 220 comprises a thermoplastic material and provides a textured surface and the other layer of the bi-layer film 220 functions as an adhesive layer. As noted in US20170217121, the layers of the film 220 may comprise fillers or may be filler-free.

Figure 2B:
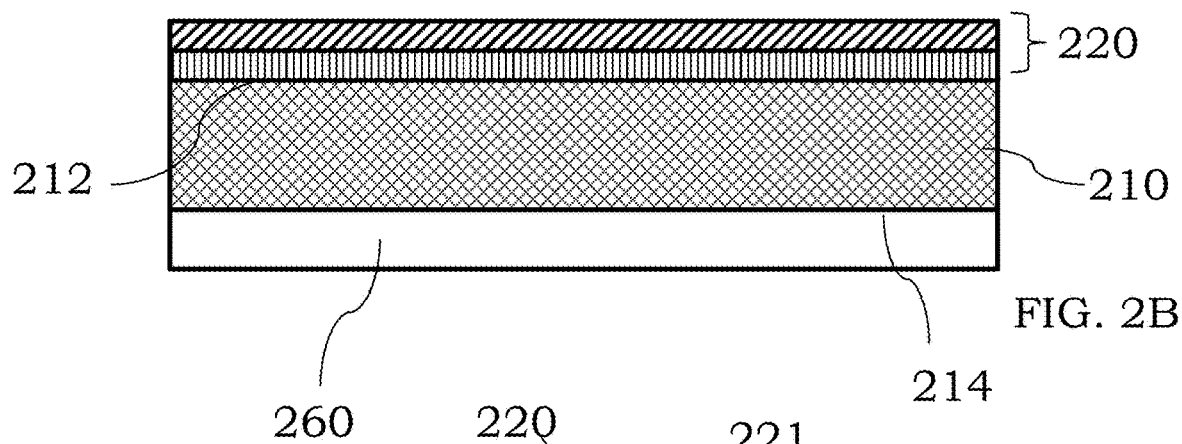
FIG. 2B is an illustration of a composite article comprising a prepreg or core layer coupled to a textured bi-layer film on one surface and a skin layer on another surface, in accordance with certain examples.

In some configurations, the composite article may comprise an additional layer disposed on another surface of the prepreg or core layer 210. Referring to FIG. 2B, a skin layer 260 is shown as being disposed on a surface 214 of the prepreg or core layer 210. If desired, the skin layer 260 may be the same as the film layer 120 or may be different. For example, the layer 260 may comprise, for example, a scrim (e.g., fiber based scrim), a foil, a woven fabric, a non-woven fabric or be present as an inorganic coating, an organic coating, or a thermoset coating disposed on the prepreg or core layer 210. In other instances, the layer 260 may comprise a limiting oxygen index greater than about 22, as measured per ISO 4589 dated 1996. Where a fiber based scrim is present as (or as part of) the layer 260, the fiber based scrim may comprise at least one of glass fibers, aramid fibers, graphite fibers, carbon fibers, inorganic mineral fibers, metal fibers, metalized synthetic fibers, and metalized inorganic fibers. Where a thermoset coating is present as (or as part of) the layer 260, the coating may comprise at least one of unsaturated polyurethanes, vinyl esters, phenolics and epoxies. Where an inorganic coating is present as (or as part of) the layer 260, the inorganic coating may comprise minerals containing cations selected from Ca, Mg, Ba, Si, Zn, Ti and Al or may comprise at least one of gypsum, calcium carbonate and mortar. Where a non-woven fabric is present as (or as part of) the layer 260, the non-woven fabric may comprise a thermoplastic material, a thermal setting binder, inorganic fibers, metal fibers, metallized inorganic fibers and metallized synthetic fibers. The thickness of the film 220 and the layer 260 may be the same or may be different. If desired, an intermediate layer (not shown) can be present between the layer 210 and the film 220 or between the layer 210 and the layer 260.

Figure 2C:
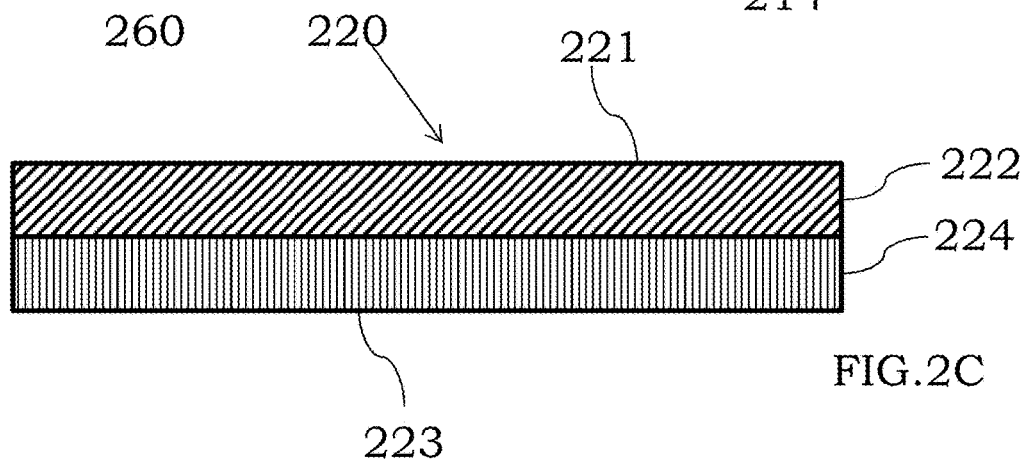
FIG. 2C shows a bi-layer film.

In certain embodiments and referring to FIG. 2C, the bilayer film 220 may comprise one or more thermoplastic materials and a texture present on a surface 221 of the film layer 220. The bilayer film 220 may comprise a first film layer 222 and a second film layer 224 which can be coupled directly to each other, e.g., without any intervening layer or material, or may be coupled to each other through an adhesive material, spot welds, or other means. The surface 223 can be textured, smooth or may have textured areas and smooth areas. The texture on the surface 221 need not be the same or uniform across the entire surface. For example, projections or depressions in the surface 221 to provide the texture may have different sizes and/or depths. In some examples, each layer 222, 224 of the bi-layer film 220 may comprise one or more thermoplastic materials including, but not limited to, polyethylene, polypropylene, polystyrene, acrylonitrylstyrene, butadiene, polyethyleneterephthalate, polybutyleneterephthalate, polybutylenetetrachlorate, polyvinyl chloride, both plasticized and unplasticized, and blends of these materials with each other or other polymeric materials. Other suitable thermoplastic materials that can be present in each of the layers 222, 224 of the bi-layer film 220 include, but are not limited to, polyarylene ethers, polycarbonates, polyestercarbonates, thermoplastic polyesters, polyimides, polyetherimides, polyamides, acrylonitrile-butylacrylate-styrene polymers, amorphous nylon, polyarylene ether ketone, polyphenylene sulfide, polyaryl sulfone, polyether sulfone, liquid crystalline polymers, poly (1,4 phenylene) compounds commercially known as PARMAX®, high heat polycarbonate such as Bayer's APEC® PC, high temperature nylon, and silicones, as well as alloys and blends of these materials with each other or other polymeric materials. In some examples, the film layers 222, 224 may each comprise one or more polyolefin materials which can be present as homopolymers, co-polymers, polymer blends, etc. The film layers 222, 224 can be extruded or co-extruded into layers, and a pattern or other features can be embossed, pressed into or otherwise formed in the surface 221 of the film layer 222. For example, the surface 221 can be subjected to physical processes such as sand-blasting, powder coating, sanding, etching, etc. to impart a texture to the surface 221. If desired, an adhesive layer (not shown) can be used with the film layer 220 to couple the film layer 220 to an underlying core layer or other layer. In some examples, one of the layers 222, 224 may comprise a polyurethane material, e.g., a polyurethane adhesive material. In some embodiments, the layer 222 may comprise a polyolefin material, e.g., a polyethylene or a polypropylene, and the layer 224 may be configured as a hot-melt adhesive layer, e.g., one with a melting temperature of around 90 degrees C. to 150 degrees C. In other configurations, the layer 222 may comprise a polyolefin material, e.g., a polyethylene or a polypropylene, and the layer 224 may be configured as a tie layer which can bond to the core layer 210 or to an adhesive layer present between the core layer 210 and the layer 224. Any one or more of the film layers 222, 224 may comprise additives such as colorants or fillers such as fibers, particles, etc. if desired. Alternatively, any one or more of the film layers 222, 224 may be filler-free. While the layers 222, 224 are illustrated as having about the same thickness, the overall thickness of any one layer can be the same or different than other layers. In some examples, the bi-layer film 220 may comprise an overall thickness of about 0.1 to about 0.2 mm, though thinner or thicker bi-layer film layers can also be used.

Figure 3A:
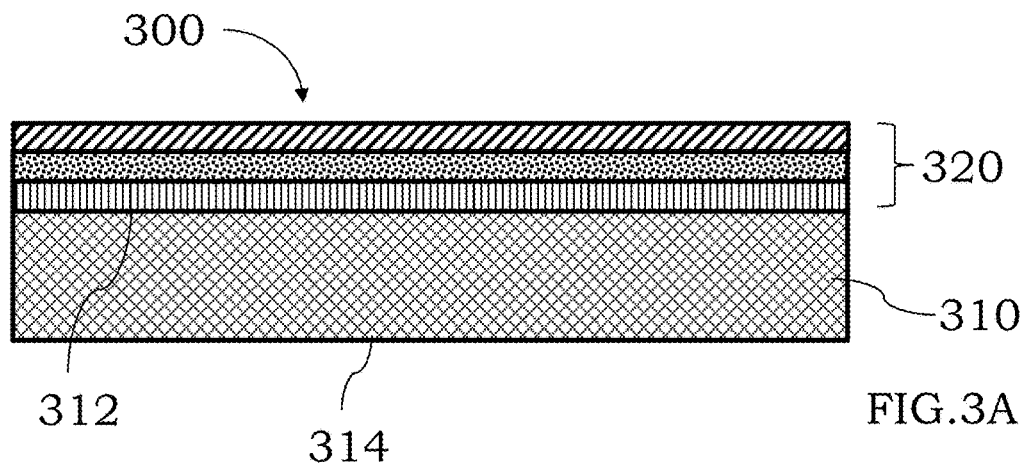
FIG. 3A is an illustration of a composite article comprising a prepreg or core layer coupled to a textured tri-layer film on one surface, in accordance with certain embodiments.
Figure 3B:
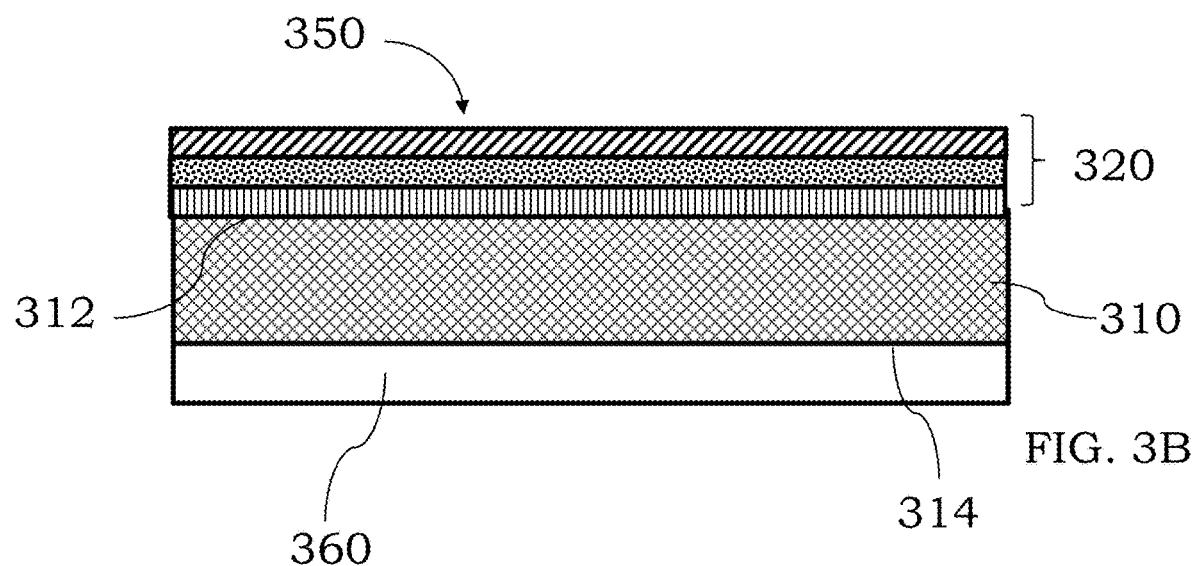
FIG. 3B is an illustration of a composite article comprising a prepreg or core layer coupled to a textured tri-layer film on one surface and a skin layer on another surface, in accordance with certain examples.

In certain examples and referring to FIG. 3A, a composite article 300 is shown that comprises a prepreg or core layer 310 and a tri-layer film 320 disposed on a surface 312 of the prepreg or core layer 310. In certain examples, the prepreg or core layer 310 may comprise any of those materials and configurations discussed in reference to the prepreg or core layer 110. For example, the prepreg or core layer 310 may comprise a thermoplastic material and reinforcing fibers, which can be held in place in the general form of a web by the thermoplastic material. The fibers can be generally arranged in a random fashion without any specific orientation or configurations. In certain examples, the thermoplastic material of the prepreg or core layer 310 may be present in fiber form, particle form, resin form or other suitable forms. In certain embodiments, the prepreg or core layer 310 generally comprises a substantial amount of open cell structure such that void space is present in the prepreg or core layer 310. For example, the prepreg or core layer 310 may comprise a void content or porosity of 0-30%, 10-40%, 20-50%, 30-60%, 40-70%, 50-80%, 60-90%, 0-40%, 0-50%, 0-60%, 0-70%, 0-80%, 0-90%, 10-50%, 10-60%, 10-70%, 10-80%, 10-90%, 10-95%, 20-60%, 20-70%, 20-80%, 20-90%, 20-95%, 30-70%, 30-80%, 30-90%, 30-95%, 40-80%, 40-90%, 40-95%, 50-90%, 50-95%, 60-95% 70-80%, 70-90%, 70-95%, 80-90%, 80-95% or any illustrative value within these exemplary ranges. In some instances, the prepreg or core layer 310 comprises a porosity or void content of greater than 0%, e.g., is not fully consolidated, up to about 95%. Unless otherwise stated, the reference to the prepreg or core layer 310 comprising a certain void content or porosity is based on the total volume of the prepreg or core layer 310 and not necessarily the total volume of the prepreg or core layer 210 plus any other materials or layers coupled to the prepreg or core layer 310.

In certain embodiments, the thermoplastic material of the prepreg or core layer 310 may comprise, at least in part, one or more of polyethylene, polypropylene, polystyrene, acrylonitrylstyrene, butadiene, polyethyleneterephthalate, polybutyleneterephthalate, polybutylenetetrachlorate, and polyvinyl chloride, both plasticized and unplasticized, and blends of these materials with each other or other polymeric materials. Other suitable thermoplastics include, but are not limited to, polyarylene ethers, polycarbonates, polyestercarbonates, thermoplastic polyesters, polyimides, polyetherimides, polyamides, acrylonitrile-butylacrylate-styrene polymers, amorphous nylon, polyarylene ether ketone, polyphenylene sulfide, polyaryl sulfone, polyether sulfone, liquid crystalline polymers, poly(1,4 phenylene) compounds commercially known as PARMAX®, high heat polycarbonate such as Bayer's APEC® PC, high temperature nylon, and silicones, as well as alloys and blends of these materials with each other or other polymeric materials. The virgin thermoplastic material used to form the prepreg or core layer 210 can be used in powder form, resin form, rosin form, fiber form or other suitable forms. Illustrative thermoplastic materials in various forms are described herein and are also described, for example in U.S. Publication Nos. 20130244528 and US20120065283. The exact amount of thermoplastic material present in the prepreg or core layer 310 can vary and illustrative amounts range from about 20% by weight to about 80% by weight.

In certain examples, the reinforcing fibers of the prepreg or core layer 310 described herein can comprise glass fibers, carbon fibers, graphite fibers, synthetic organic fibers, particularly high modulus organic fibers such as, for example, para- and meta-aramid fibers, nylon fibers, polyester fibers, or any high melt flow index resins that are suitable for use as fibers, natural fibers such as hemp, sisal, jute, flax, coir, kenaf and cellulosic fibers, mineral fibers such as basalt, mineral wool (e.g., rock or slag wool), wollastonite, alumina silica, and the like, or mixtures thereof, metal fibers, metalized natural and/or synthetic fibers, ceramic fibers, yarn fibers, or mixtures thereof. In some instances, one type of the reinforcing fibers may be used along with mineral fibers such as, for example, fibers formed by spinning or drawing molten minerals. Illustrative mineral fibers include, but are not limited to, mineral wool fibers, glass wool fibers, stone wool fibers, and ceramic wool fibers. In some embodiments, any of the aforementioned fibers can be chemically treated prior to use to provide desired functional groups or to impart other physical properties to the fibers. The total fiber content in the prepreg or core layer 310 may be from about 20% to about 90% by weight of the prepreg or core layer 310, more particularly from about 30% to about 70%, by weight of the prepreg or core layer 310. Typically, the fiber content of a composite article comprising the prepreg or core layer 310 varies between about 20% to about 90% by weight, more particularly about 30% by weight to about 80% by weight, e.g., about 40% to about 70% by weight of the composite. The particular size and/or orientation of the fibers used may depend, at least in part, on the polymer material used and/or the desired properties of the resulting prepreg. Suitable additional types of fibers, fiber sizes and amounts will be readily selected by the person of ordinary skill in the art, given the benefit of this disclosure. In one non-limiting illustration, fibers dispersed within a thermoplastic material to provide a prepreg or core layer generally have a diameter of greater than about 5 microns, more particularly from about 5 microns to about 22 microns, and a length of from about 5 mm to about 200 mm. More particularly, the fiber diameter may be from about microns to about 22 microns and the fiber length may be from about 5 mm to about 75 mm. In some configurations, the flame retardant material may be present in fiber form. For example, the prepreg or core layer 310 may comprise a thermoplastic material, reinforcing fibers and fibers comprising a flame retardant material, e.g., fibers comprising an EG material or an inorganic flame retardant material. The flame retardant fibers may comprise any one or more of the flame retardant materials described herein, e.g., polypropylene fibers compounded with a hydroxide material which is then extruded and cut into fibers using a suitable die or other devices, or EG materials mixed with polypropylene fibers compounded with a hydroxide material which is then extruded and cut into fibers using a suitable die or other devices.

In some configurations, the prepreg or core layer 310 may be a substantially halogen free or halogen free prepreg to meet the restrictions on hazardous substances requirements for certain applications. In other instances, the prepreg may comprise a halogenated flame retardant agent (which can be present in the flame retardant material or may be added in addition to the flame retardant material) such as, for example, a halogenated flame retardant that comprises one of more of F, Cl, Br, I, and At or compounds that including such halogens, e.g., tetrabromo bisphenol-A polycarbonate or monohalo-, dihalo-, trihalo- or tetrahalo-polycarbonates. In some instances, the thermoplastic material used in the prepregs and cores may comprise one or more halogens to impart some flame retardancy without the addition of another flame retardant agent. For example, the thermoplastic material may be halogenated in addition to there being a flame retardant material present, or the virgin thermoplastic material may be halogenated and used by itself. Where halogenated flame retardants are present, the flame retardant is desirably present in a flame retardant amount, which can vary depending on the other components which are present. For example, the halogenated flame retardant where present in addition to the flame retardant material may be present in about 0.1 weight percent to about 40 weight percent (based on the weight of the prepreg), more particularly about 1 weight percent to about 13 weight percent, e.g., about 5 weight percent to about 13 weight percent. If desired, two different halogenated flame retardants may be added to the prepregs. In other instances, a non-halogenated flame retardant agent such as, for example, a flame retardant agent comprising one or more of N, P, As, Sb, Bi, S, Se, and Te can be added. In some embodiments, the non-halogenated flame retardant may comprise a phosphorated material so the prepregs or core layers may be more environmentally friendly. Where non-halogenated or substantially halogen free flame retardants are present, the flame retardant is desirably present in a flame retardant amount, which can vary depending on the other components which are present. For example, the substantially halogen free flame retardant may be present in about 0.1 weight percent to about 40 weight percent (based on the weight of the prepreg), more particularly about 5 weight percent to about 40 weight percent, e.g., about 5 weight percent to about 15 weight percent based on the weight of the prepreg. If desired, two different substantially halogen free flame retardants may be added to the prepregs. In certain instances, the prepregs described herein may comprise one or more halogenated flame retardants in combination with one or more substantially halogen free flame retardants. Where two different flame retardants are present, the combination of the two flame retardants may be present in a flame retardant amount, which can vary depending on the other components which are present. For example, the total weight of flame retardants present may be about 0.1 weight percent to about 40 weight percent (based on the weight of the prepreg or core), more particularly about 5 weight percent to about 40 weight percent, e.g., about 2 weight percent to about 15 weight percent based on the weight of the prepreg or core. The flame retardant agents used in the prepregs or cores described herein can be added to the mixture comprising the thermoplastic material and fibers (prior to disposal of the mixture on a wire screen or other processing component) or can be added after the prepreg or core is formed.

In certain examples, the tri-layer film 320 can be coupled directly to the prepreg or core layer 310 or an adhesive layer can be present between the prepreg or core layer 310 and the tri-layer film 320 or one of the layers of the tri-layer film 320 itself may comprise an adhesive layer or a layer which can function to adhere other layers of the tri-layer film 320 to the prepreg or core layer 310. In general, the tri-layer film 320 comprises one or more polymeric layers that can provide desirable physical characteristics to the overall article. For example, the tri-layer film 320 can be selected such that it smooths out the article by hiding the rough surface of the prepreg or core layer 310. In other instances, the tri-layer film 320 may provide a texture to the article such that a certain surface roughness is present. In yet other instances, the tri-layer film 320 may hide or mask the underlying roughness of the prepreg or core layer 310 while at the same time providing a desired texture or feel to the composite article including the tri-layer film 320. In certain examples, the rough nature of the prepreg or core layer 310 can be used in combination with the tri-layer film 320 to provide a textured or non-smooth surface.

In certain embodiments, the tri-layer film 320 can provide some texture on an outer surface of the film 320. Each side of the film 320 need not be textured. For example, a side of the film 320 facing the prepreg or core layer 310 and disposed on the surface 312 can be smooth, rough, textured, or may have other physical characteristics. A side of the film 320 facing away from the surface 312 may provide some texture to the overall article that includes the film 320. While various materials can be present in the film 320, the film 320 typically comprises one or more thermoplastic materials. For example, certain layers of the film may comprise those materials described in US20170217121. In some examples, at least one layer of the tri-layer film 320 comprises a thermoplastic material and provides a textured surface. In some examples, one layer of the tri-layer film 320 may function as an adhesive layer. In some instances, a tie layer can be present between the textured surface layer and the adhesive layer of the tri-layer film 320. Various film layers of the film 320 may comprise fillers or may be filler free, as noted in US20170217121.

Figure 3C:
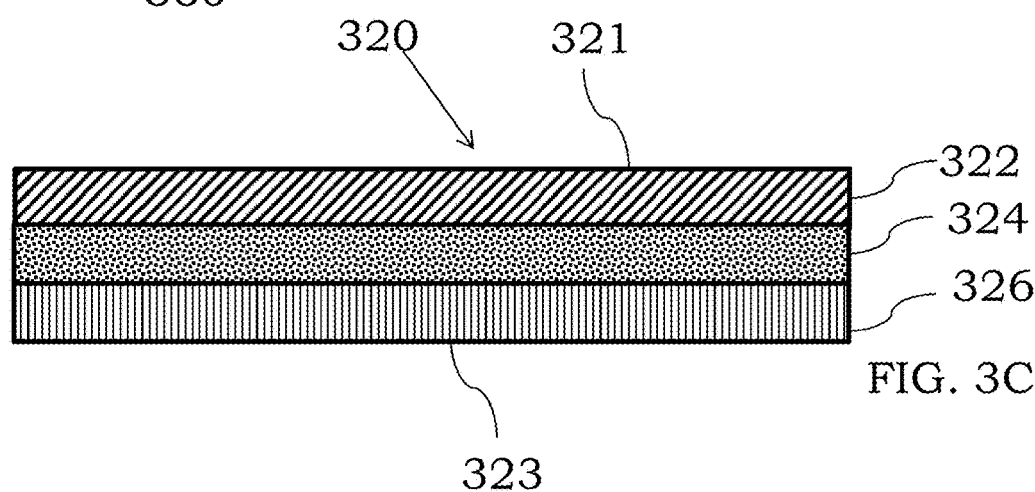
FIG. 3C shows a tri-layer film.

In certain configuration and referring to FIG. 3C, the tri-layer film 320 may comprise one or more thermoplastic materials and a texture present on a surface 321 of the film layer 320. The tri-layer film 320 may comprise a first film layer 322, a second film layer 324 and a third film layer 326. Each of the film layers 322, 324, 326 can be coupled directly to each other, e.g., without any intervening layer or material, or may be coupled to each other through an adhesive material, spot welds, or other means. The surface 323 can be textured, smooth or may have textured areas and smooth areas. The texture on the surface 321 need not be the same or uniform across the entire surface. For example, projections or depressions in the surface 321 to provide the texture may have different sizes and/or depths. In some examples, each layer 322, 324, 326 of the tri-layer film 320 may comprise one or more thermoplastic materials including, but not limited to, polyethylene, polypropylene, polystyrene, acrylonitrylstyrene, butadiene, polyethyleneterephthalate, polybutyleneterephthalate, polybutylenetetrachlorate, polyvinyl chloride, both plasticized and unplasticized, and blends of these materials with each other or other polymeric materials. Other suitable thermoplastic materials that can be present in each of the layers 322, 324, 326 of the tri-layer film 320 include, but are not limited to, polyarylene ethers, polycarbonates, polyestercarbonates, thermoplastic polyesters, polyimides, polyetherimides, polyamides, acrylonitrile-butylacrylate-styrene polymers, amorphous nylon, polyarylene ether ketone, polyphenylene sulfide, polyaryl sulfone, polyether sulfone, liquid crystalline polymers, poly (1,4 phenylene) compounds commercially known as PARMAX®, high heat polycarbonate such as Bayer's APEC® PC, high temperature nylon, and silicones, as well as alloys and blends of these materials with each other or other polymeric materials. In some examples, the film layers 322, 324, 326 may each comprise one or more polyolefin materials which can be present as homopolymers, co-polymers, polymer blends, etc. The film layers 322, 324, 326 can be extruded or co-extruded into layers, and a pattern or other features can be embossed, pressed into or otherwise formed in the surface 321 of the film layer 322. For example, the surface 321 can be subjected to physical processes such as sand-blasting, powder coating, sanding, etching, etc. to impart a texture to the surface 321. If desired, an adhesive layer (not shown) can be used with the film layer 320 to couple the film layer 320 to an underlying core layer or other layer. In some examples, one of the layers 322, 326 may comprise a polyurethane material, e.g., a polyurethane adhesive material. In some embodiments, the layer 322 may comprise a polyolefin material, e.g., a polyethylene or a polypropylene, and the layer 326 may be configured as a hot-melt adhesive layer, e.g., one with a melting temperature of around 90 degrees C. to 150 degrees C. In other configurations, the layer 322 may comprise a polyolefin material, e.g., a polyethylene or a polypropylene, the layer 324 may be configured as a tie layer, e.g., which may also comprise a polyolefin such as a polyethylene or a polypropylene and the layer 326 can be configured as a hot melt adhesive as described herein. In some embodiments, an outer layer, e.g., layer 322 may comprise a polyurethane material with a texture present on the surface. Any one or more of the film layer 322, 324 and 326 may comprise additives such as colorants or fillers such as fibers, particles, etc. if desired. Alternatively, any one or more of the film layer 322, 324 and 326 may be filler-free. While the layers 322, 324 and 326 are illustrated as having about the same thickness, the overall thickness of any one layer can be the same or different than other layers. In some examples, the tri-layer film 320 may comprise an overall thickness of about 0.1 to about 0.2 mm, though thinner or thicker tri-layer film layers can also be used.

Figure 4A:
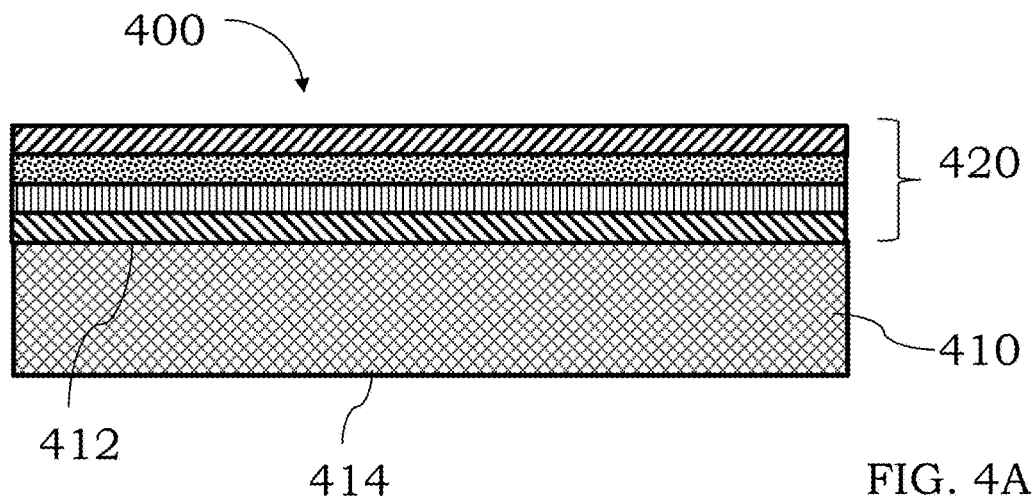
FIG. 4A is an illustration of a composite article comprising a prepreg or core layer coupled to a textured tetra-layer film on one surface, in accordance with certain examples.
Figure 4B:
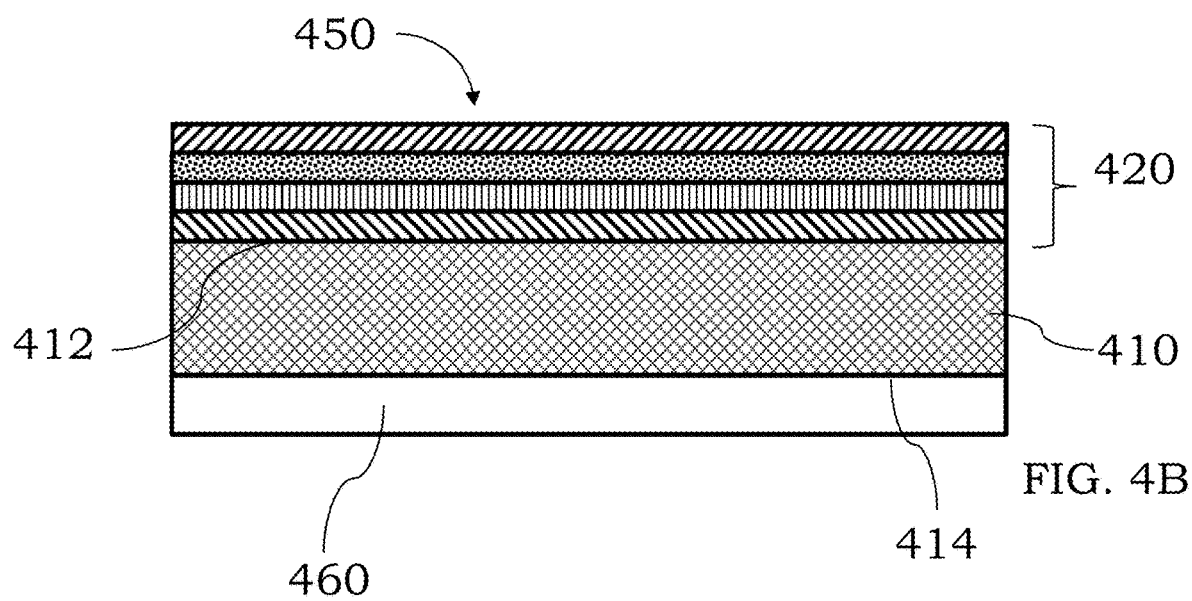
FIG. 4B is an illustration of a composite article comprising a prepreg or core layer coupled to a textured tetra-layer film on one surface and a skin layer on another surface, in accordance with certain configurations.

In certain examples and referring to FIG. 4A, a composite article 400 is shown that comprises a prepreg or core layer 310 and a tetra-layer film 420 disposed on a surface 412 of the prepreg or core layer 410. In certain examples, the prepreg or core layer 410 may comprise any of those materials and configurations discussed in reference to the prepreg or core layer 110. For example, the prepreg or core layer 410 may comprise a thermoplastic material and reinforcing fibers, which can be held in place in the general form of a web by the thermoplastic material. The fibers can be generally arranged in a random fashion without any specific orientation or configurations. In certain examples, the thermoplastic material of the prepreg or core layer 410 may be present in fiber form, particle form, resin form or other suitable forms. In certain embodiments, the prepreg or core layer 410 generally comprises a substantial amount of open cell structure such that void space is present in the prepreg or core layer 410. For example, the prepreg or core layer 310 may comprise a void content or porosity of 0-30%, 10-40%, 20-50%, 30-60%, 40-70%, 50-80%, 60-90%, 0-40%,0-50%, 0-60%, 0-70%, 0-80%, 0-90%, 10-50%, 10-60%, 10-70%, 10-80%, 10-90%, 10-95%, 20-60%, 20-70%, 20-80%, 20-90%, 20-95%, 30-70%, 30-80%, 30-90%, 30-95%, 40-80%, 40-90%, 40-95%, 50-90%, 50-95%, 60-95% 70-80%, 70-90%, 70-95%, 80-90%, 80-95% or any illustrative value within these exemplary ranges. In some instances, the prepreg or core layer 410 comprises a porosity or void content of greater than 0%, e.g., is not fully consolidated, up to about 95%. Unless otherwise stated, the reference to the prepreg or core layer 410 comprising a certain void content or porosity is based on the total volume of the prepreg or core layer 410 and not necessarily the total volume of the prepreg or core layer 210 plus any other materials or layers coupled to the prepreg or core layer 410.

In certain embodiments, the thermoplastic material of the prepreg or core layer 410 may comprise, at least in part, one or more of polyethylene, polypropylene, polystyrene, acrylonitrylstyrene, butadiene, polyethyleneterephthalate, polybutyleneterephthalate, polybutylenetetrachlorate, and polyvinyl chloride, both plasticized and unplasticized, and blends of these materials with each other or other polymeric materials. Other suitable thermoplastics include, but are not limited to, polyarylene ethers, polycarbonates, polyestercarbonates, thermoplastic polyesters, polyimides, polyetherimides, polyamides, acrylonitrile-butylacrylate-styrene polymers, amorphous nylon, polyarylene ether ketone, polyphenylene sulfide, polyaryl sulfone, polyether sulfone, liquid crystalline polymers, poly(1,4 phenylene) compounds commercially known as PARMAX®, high heat polycarbonate such as Bayer's APEC® PC, high temperature nylon, and silicones, as well as alloys and blends of these materials with each other or other polymeric materials. The virgin thermoplastic material used to form the prepreg or core layer 210 can be used in powder form, resin form, rosin form, fiber form or other suitable forms. Illustrative thermoplastic materials in various forms are described herein and are also described, for example in U.S. Publication Nos. 20130244528 and US20120065283. The exact amount of thermoplastic material present in the prepreg or core layer 410 can vary and illustrative amounts range from about 20% by weight to about 80% by weight.

In certain examples, the reinforcing fibers of the prepreg or core layer 410 described herein can comprise glass fibers, carbon fibers, graphite fibers, synthetic organic fibers, particularly high modulus organic fibers such as, for example, para- and meta-aramid fibers, nylon fibers, polyester fibers, or any high melt flow index resins that are suitable for use as fibers, natural fibers such as hemp, sisal, jute, flax, coir, kenaf and cellulosic fibers, mineral fibers such as basalt, mineral wool (e.g., rock or slag wool), wollastonite, alumina silica, and the like, or mixtures thereof, metal fibers, metalized natural and/or synthetic fibers, ceramic fibers, yarn fibers, or mixtures thereof. In some instances, one type of the reinforcing fibers may be used along with mineral fibers such as, for example, fibers formed by spinning or drawing molten minerals. Illustrative mineral fibers include, but are not limited to, mineral wool fibers, glass wool fibers, stone wool fibers, and ceramic wool fibers. In some embodiments, any of the aforementioned fibers can be chemically treated prior to use to provide desired functional groups or to impart other physical properties to the fibers. The total fiber content in the prepreg or core layer 410 may be from about 20% to about 90% by weight of the prepreg or core layer 410, more particularly from about 30% to about 70%, by weight of the prepreg or core layer 410. Typically, the fiber content of a composite article comprising the prepreg or core layer 410 varies between about 20% to about 90% by weight, more particularly about 30% by weight to about 80% by weight, e.g., about 40% to about 70% by weight of the composite. The particular size and/or orientation of the fibers used may depend, at least in part, on the polymer material used and/or the desired properties of the resulting prepreg. Suitable additional types of fibers, fiber sizes and amounts will be readily selected by the person of ordinary skill in the art, given the benefit of this disclosure. In one non-limiting illustration, fibers dispersed within a thermoplastic material to provide a prepreg or core layer generally have a diameter of greater than about 5 microns, more particularly from about 5 microns to about 22 microns, and a length of from about 5 mm to about 200 mm. More particularly, the fiber diameter may be from about microns to about 22 microns and the fiber length may be from about 5 mm to about 75 mm. In some configurations, the flame retardant material may be present in fiber form. For example, the prepreg or core layer 410 may comprise a thermoplastic material, reinforcing fibers and fibers comprising a flame retardant material, e.g., fibers comprising an EG material or an inorganic flame retardant material. The flame retardant fibers may comprise any one or more of the flame retardant materials described herein, e.g., polypropylene fibers compounded with a hydroxide material which is then extruded and cut into fibers using a suitable die or other devices, or EG materials mixed with polypropylene fibers compounded with a hydroxide material which is then extruded and cut into fibers using a suitable die or other devices.

In some configurations, the prepreg or core layer 410 may be a substantially halogen free or halogen free prepreg to meet the restrictions on hazardous substances requirements for certain applications. In other instances, the prepreg may comprise a halogenated flame retardant agent (which can be present in the flame retardant material or may be added in addition to the flame retardant material) such as, for example, a halogenated flame retardant that comprises one of more of F, Cl, Br, I, and At or compounds that including such halogens, e.g., tetrabromo bisphenol-A polycarbonate or monohalo-, dihalo-, trihalo- or tetrahalo-polycarbonates. In some instances, the thermoplastic material used in the prepregs and cores may comprise one or more halogens to impart some flame retardancy without the addition of another flame retardant agent. For example, the thermoplastic material may be halogenated in addition to there being a flame retardant material present, or the virgin thermoplastic material may be halogenated and used by itself. Where halogenated flame retardants are present, the flame retardant is desirably present in a flame retardant amount, which can vary depending on the other components which are present. For example, the halogenated flame retardant where present in addition to the flame retardant material may be present in about 0.1 weight percent to about 15 weight percent (based on the weight of the prepreg), more particularly about 1 weight percent to about 13 weight percent, e.g., about 5 weight percent to about 13 weight percent. If desired, two different halogenated flame retardants may be added to the prepregs. In other instances, a non-halogenated flame retardant agent such as, for example, a flame retardant agent comprising one or more of N, P, As, Sb, Bi, S, Se, and Te can be added. In some embodiments, the non-halogenated flame retardant may comprise a phosphorated material so the prepregs or core layers may be more environmentally friendly. Where non-halogenated or substantially halogen free flame retardants are present, the flame retardant is desirably present in a flame retardant amount, which can vary depending on the other components which are present. For example, the substantially halogen free flame retardant may be present in about 0.1 weight percent to about 40 weight percent (based on the weight of the prepreg), more particularly about 5 weight percent to about 40 weight percent, e.g., about 5 weight percent to about 15 weight percent based on the weight of the prepreg. If desired, two different substantially halogen free flame retardants may be added to the prepregs. In certain instances, the prepregs described herein may comprise one or more halogenated flame retardants in combination with one or more substantially halogen free flame retardants. Where two different flame retardants are present, the combination of the two flame retardants may be present in a flame retardant amount, which can vary depending on the other components which are present. For example, the total weight of flame retardants present may be about 0.1 weight percent to about 40 weight percent (based on the weight of the prepreg or core), more particularly about 51 weight percent to about 40 weight percent, e.g., about 2 weight percent to about 15 weight percent based on the weight of the prepreg or core. The flame retardant agents used in the prepregs or cores described herein can be added to the mixture comprising the thermoplastic material and fibers (prior to disposal of the mixture on a wire screen or other processing component) or can be added after the prepreg or core is formed.

In certain examples, the tetra-layer film 420 can be coupled directly to the prepreg or core layer 410 or an adhesive layer can be present between the prepreg or core layer 410 and the tetra-layer film 420 or one of the layers of the tetra-layer film 420 itself may comprise an adhesive layer or a layer which can function to adhere other layers of the tetra-layer film 420 to the prepreg or core layer 410. In general, the tetra-layer film 420 comprises one or more polymeric layers that can provide desirable physical characteristics to the overall article. For example, the tetra-layer film 420 can be selected such that it smooths out the article by hiding the rough surface of the prepreg or core layer 410. In other instances, the tetra-layer film 420 may provide a texture to the article such that a certain surface roughness is present. In yet other instances, the tetra-layer film 420 may hide or mask the underlying roughness of the prepreg or core layer 410 while at the same time providing a desired texture or feel to the composite article including the tetra-layer film 420. In certain examples, the rough nature of the prepreg or core layer 410 can be used in combination with the tetra-layer film 420 to provide a textured or non-smooth surface.

In certain embodiments, the tetra-layer film 320 can provide some texture on an outer surface of the film 420. Each side of the film 420 need not be textured. For example, a side of the film 420 facing the prepreg or core layer 410 and disposed on the surface 412 can be smooth, rough, textured, or may have other physical characteristics. A side of the film 420 facing away from the surface 412 may provide some texture to the overall article that includes the film 420. While various materials can be present in the film 420, the film 420 typically comprises one or more thermoplastic materials. For example, certain layers of the film may comprise those materials described in US20170217121. In some examples, at least one layer of the tetra-layer film 420 comprises a thermoplastic material and provides a textured surface. In some examples, one layer of the tetra-layer film 420 may function as an adhesive layer. In some instances, a tie layer can be present between a textured layer and the adhesive layer of the tetra-layer film 420. Various film layers of the film 420 may comprise fillers or may be filler free, as noted in US20170217121.

Figure 4C:
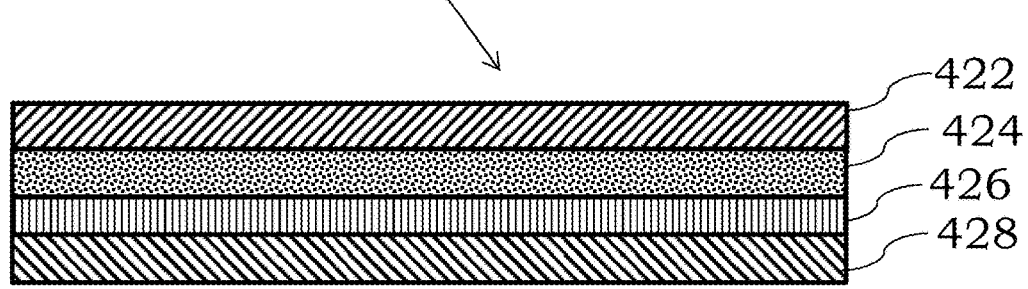
FIG. 4C shows a tetra-layer film

In certain configuration and referring to FIG. 4C, the tetra-layer film 420 may comprise one or more thermoplastic materials and a texture present on a surface 421 of the film layer 420. The tetra-layer film 420 may comprise a first film layer 422, a second film layer 424, a third film layer 426 and a fourth film layer 428. Each of the film layers 422, 424, 426, 428 can be coupled directly to each other, e.g., without any intervening layer or material, or may be coupled to each other through an adhesive material, spot welds, or other means. The surface 423 can be textured, smooth or may have textured areas and smooth areas. The texture on the surface 341 need not be the same or uniform across the entire surface. For example, projections or depressions in the surface 421 to provide the texture may have different sizes and/or depths. In some examples, each layer 422, 424, 426, 428 of the tetra-layer film 420 may comprise one or more thermoplastic materials including, but not limited to, polyethylene, polypropylene, polystyrene, acrylonitrylstyrene, butadiene, polyethyleneterephthalate, polybutyleneterephthalate, polybutylenetetrachlorate, polyvinyl chloride, both plasticized and unplasticized, and blends of these materials with each other or other polymeric materials. Other suitable thermoplastic materials that can be present in each of the layers 422, 424, 426, 428 of the tri-layer film 420 include, but are not limited to, polyarylene ethers, polycarbonates, polyestercarbonates, thermoplastic polyesters, polyimides, polyetherimides, polyamides, acrylonitrile-butylacrylate-styrene polymers, amorphous nylon, polyarylene ether ketone, polyphenylene sulfide, polyaryl sulfone, polyether sulfone, liquid crystalline polymers, poly(1,4 phenylene) compounds commercially known as PARMAX®, high heat polycarbonate such as Bayer's APEC® PC, high temperature nylon, and silicones, as well as alloys and blends of these materials with each other or other polymeric materials. In some examples, the film layers 422, 424, 426, 428 may each comprise one or more polyolefin materials which can be present as homopolymers, co-polymers, polymer blends, etc. The film layers 422, 424, 426, 428 can be extruded or co-extruded into layers, and a pattern or other features can be embossed, pressed into or otherwise formed in the surface 421 of the film layer 422. For example, the surface 421 can be subjected to physical processes such as sand-blasting, powder coating, sanding, etching, etc. to impart a texture to the surface 421. If desired, an adhesive layer (not shown) can be used with the film layer 420 to couple the film layer 420 to an underlying core layer or other layer. In some examples, one of the layers 424, 428 may comprise a polyurethane material, e.g., a polyurethane adhesive material. In some embodiments, the layer 422 may comprise a polyolefin material, e.g., a polyethylene or a polypropylene, and the layer 428 may be configured as a hot-melt adhesive layer, e.g., one with a melting temperature of around 90 degrees C. to 150 degrees C. In other configurations, the layer 422 may comprise a polyolefin material, e.g., a polyethylene or a polypropylene, the layer 424 may be configured as a tie layer, e.g., which may also comprise a polyolefin such as a polyethylene or a polypropylene, the layer 426 may comprise a polyolefin material or a polyurethane material, and the layer 428 can be configured as a hot melt adhesive as described herein. In some embodiments, an outer layer, e.g., layer 422 may comprise a polyurethane material with a texture present on the surface. Any one or more of the film layer 422, 424, 426, 428 may comprise additives such as colorants or fillers such as fibers, particles, etc. if desired. Alternatively, any one or more of the film layer 422, 424, 426, 428 may be filler-free. While the layers 422, 424, 426 and 428 are illustrated as having about the same thickness, the overall thickness of any one layer can be the same or different than other layers. In some examples, the tetra-layer film 420 may comprise an overall thickness of about 0.1 to about 0.2 mm, though thinner or thicker tri-layer film layers can also be used.

While single layer, bi-layer, tri-layer and tetra-layer films are shown and described herein in various illustrations, it will be recognized by the person of ordinary skill in the art, given the benefit of this disclosure, that films with five, six, seven, eight or more layers can also be used if desired. Where films with five or more layers are used, the multi-layer film desirably imparts some texture to a surface of the article comprising the multi-layered film.

Figure 5:
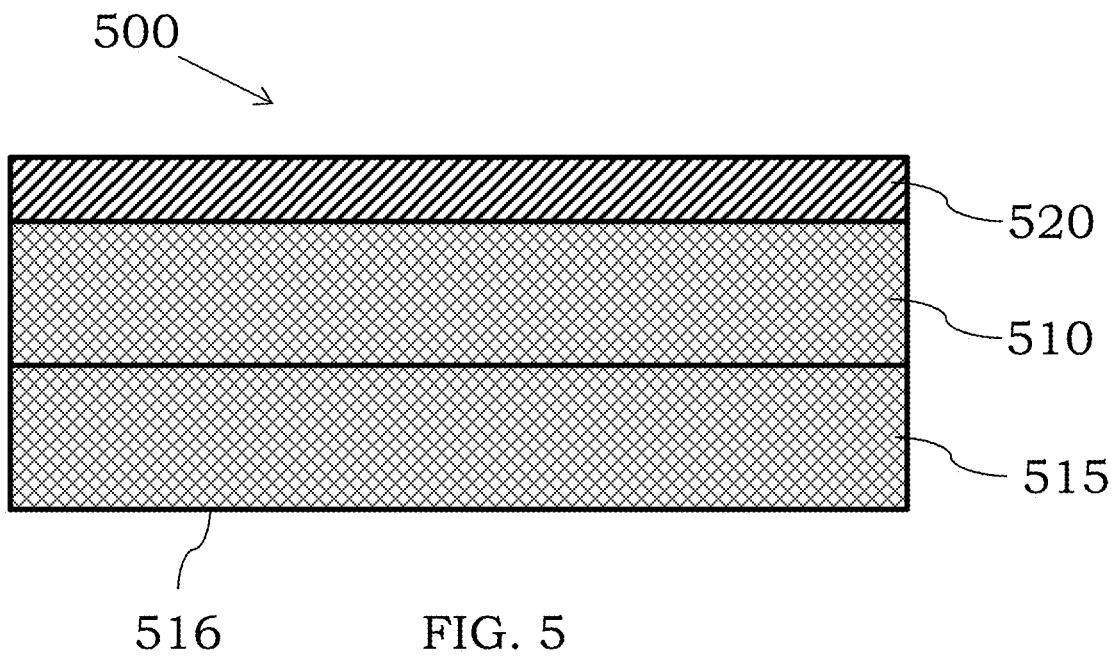
FIG. 5 is an illustration of a composite article comprising two prepreg or core layers coupled to and a textured film layer, in accordance with some examples.

In certain embodiments, the prepreg or core layers described herein can be present in the articles in stacks or plies. Referring to FIG. 5, an article comprises a first prepreg or core layer 510 stacked on a second prepreg or core layer 515. A single layer textured film 520 is disposed on a surface of the layer 510. The single layer textured film 520 may be configured similar to the film 120. While not shown, a skin layer can be disposed on surface 516 of the layer 515. For example, the layer disposed on the surface 516 may be the same as the film layer 520 or may be different. The layer disposed on the surface 516 may comprise, for example, a scrim (e.g., fiber based scrim), a foil, a woven fabric, a non-woven fabric or be present as an inorganic coating, an organic coating, or a thermoset coating disposed on the prepreg or core layer 515. In other instances, the layer disposed on the surface 516 may comprise a limiting oxygen index greater than about 22, as measured per ISO 4589 dated 1996. Where a fiber based scrim is present as (or as part of) the layer disposed on the surface 516, the fiber based scrim may comprise at least one of glass fibers, aramid fibers, graphite fibers, carbon fibers, inorganic mineral fibers, metal fibers, metalized synthetic fibers, and metalized inorganic fibers. Where a thermoset coating is present as (or as part of) the layer disposed on the surface 516, the coating may comprise at least one of unsaturated polyurethanes, vinyl esters, phenolics and epoxies. Where an inorganic coating is present as (or as part of) the layer disposed on the surface 516, the inorganic coating may comprise minerals containing cations selected from Ca, Mg, Ba, Si, Zn, Ti and Al or may comprise at least one of gypsum, calcium carbonate and mortar. Where a non-woven fabric is present as (or as part of) the layer disposed on the surface 516, the non-woven fabric may comprise a thermoplastic material, a thermal setting binder, inorganic fibers, metal fibers, metallized inorganic fibers and metallized synthetic fibers. If desired, an intermediate layer (not shown) can be present between the layer 510 and the layer 520 or between the layer 510 and the layer 515. The layers 510, 515 may be the same or may be different. Further, the layers 510, 515 may comprise the same materials but have a different thickness. In some examples, the layers 510, 515 may comprise the same materials but in different amounts, e.g., more fibers can be present in one of the layers 510, 515.

Figure 6:
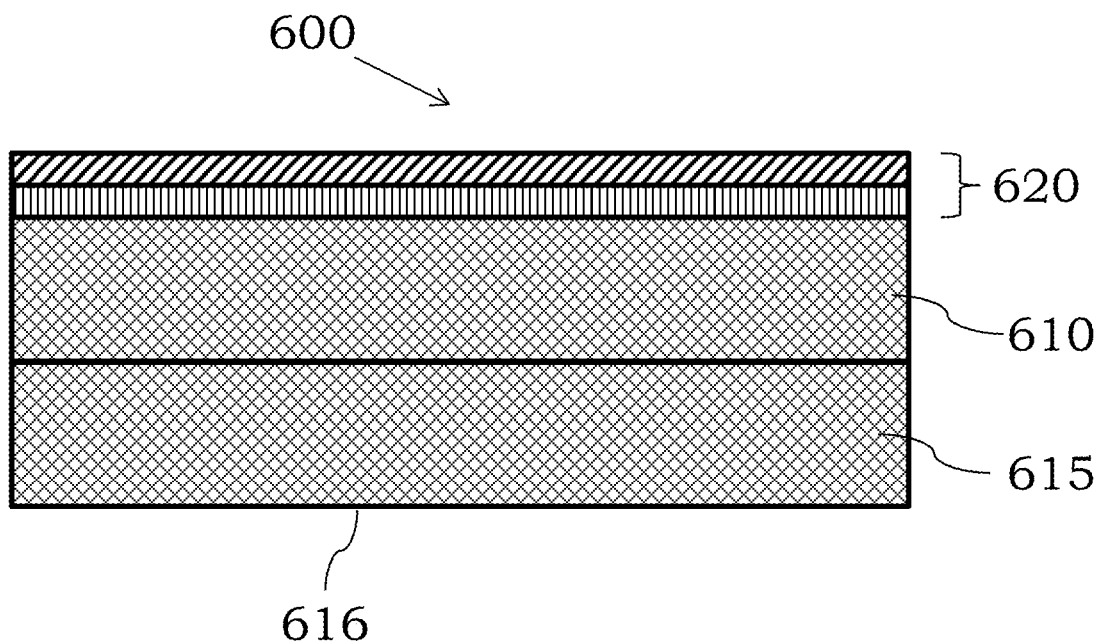
FIG. 6 is an illustration of a composite article comprising two prepreg or core layers coupled to and a bi-layer textured film, in accordance with some examples.

In some examples, an article with stacked prepreg or core layers may comprise a bi-layer film. Referring to FIG. 6, an article comprises a first prepreg or core layer 610 stacked on a second prepreg or core layer 615. A bi- layer textured film 620 is disposed on a surface of the layer 610. The bi-layer textured film 620 may be configured, for example, similar to the film 220. While not shown, a skin layer can be disposed on surface 616 of the layer 615. For example, the layer disposed on the surface 616 may be the same as the film layer 620 or may be different. The layer disposed on the surface 616 may comprise, for example, a scrim (e.g., fiber based scrim), a foil, a woven fabric, a non-woven fabric or be present as an inorganic coating, an organic coating, or a thermoset coating disposed on the prepreg or core layer 615. In other instances, the layer disposed on the surface 616 may comprise a limiting oxygen index greater than about 22, as measured per ISO 4589 dated 1996. Where a fiber based scrim is present as (or as part of) the layer disposed on the surface 616, the fiber based scrim may comprise at least one of glass fibers, aramid fibers, graphite fibers, carbon fibers, inorganic mineral fibers, metal fibers, metalized synthetic fibers, and metalized inorganic fibers. Where a thermoset coating is present as (or as part of) the layer disposed on the surface 616, the coating may comprise at least one of unsaturated polyurethanes, vinyl esters, phenolics and epoxies. Where an inorganic coating is present as (or as part of) the layer disposed on the surface 616, the inorganic coating may comprise minerals containing cations selected from Ca, Mg, Ba, Si, Zn, Ti and Al or may comprise at least one of gypsum, calcium carbonate and mortar. Where a non-woven fabric is present as (or as part of) the layer disposed on the surface 616, the non-woven fabric may comprise a thermoplastic material, a thermal setting binder, inorganic fibers, metal fibers, metallized inorganic fibers and metallized synthetic fibers. If desired, an intermediate layer (not shown) can be present between the layer 610 and the layer 620 or between the layer 610 and the layer 615. The layers 610, 615 may be the same or may be different. Further, the layers 610, 615 may comprise the same materials but have a different thickness. In some examples, the layers 610, 615 may comprise the same materials but in different amounts, e.g., more fibers can be present in one of the layers 610, 615.

Figure 7:
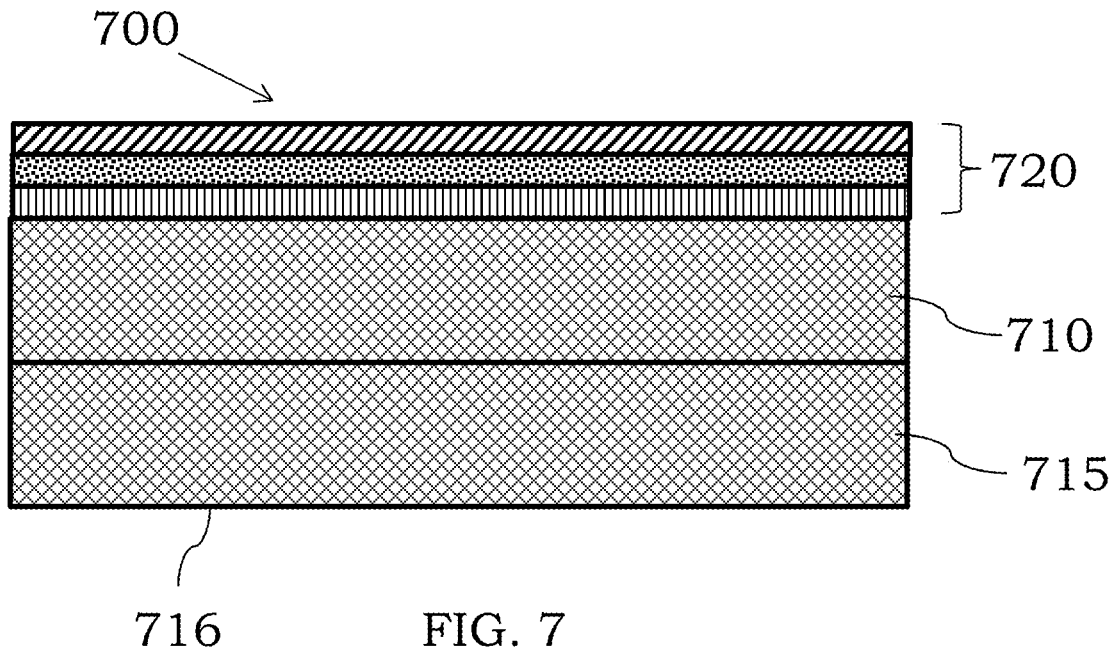
FIG. 7 is an illustration of a composite article comprising two prepreg or core layers coupled to and a tri-layer textured film, in accordance with some examples.

In some examples, an article with stacked prepreg or core layers may comprise a tri-layer film. Referring to FIG. 7, an article comprises a first prepreg or core layer 710 stacked on a second prepreg or core layer 715. A tri-layer textured film 720 is disposed on a surface of the layer 710. The tri-layer textured film 720 may be configured, for example, similar to the film 320. While not shown, a skin layer can be disposed on surface 716 of the layer 715. For example, the layer disposed on the surface 716 may be the same as the film layer 720 or may be different. The layer disposed on the surface 716 may comprise, for example, a scrim (e.g., fiber based scrim), a foil, a woven fabric, a non-woven fabric or be present as an inorganic coating, an organic coating, or a thermoset coating disposed on the prepreg or core layer 715. In other instances, the layer disposed on the surface 716 may comprise a limiting oxygen index greater than about 22, as measured per ISO 4589 dated 1996. Where a fiber based scrim is present as (or as part of) the layer disposed on the surface 716, the fiber based scrim may comprise at least one of glass fibers, aramid fibers, graphite fibers, carbon fibers, inorganic mineral fibers, metal fibers, metalized synthetic fibers, and metalized inorganic fibers. Where a thermoset coating is present as (or as part of) the layer disposed on the surface 716, the coating may comprise at least one of unsaturated polyurethanes, vinyl esters, phenolics and epoxies. Where an inorganic coating is present as (or as part of) the layer disposed on the surface 716, the inorganic coating may comprise minerals containing cations selected from Ca, Mg, Ba, Si, Zn, Ti and Al or may comprise at least one of gypsum, calcium carbonate and mortar. Where a non-woven fabric is present as (or as part of) the layer disposed on the surface 716, the non-woven fabric may comprise a thermoplastic material, a thermal setting binder, inorganic fibers, metal fibers, metallized inorganic fibers and metallized synthetic fibers. If desired, an intermediate layer (not shown) can be present between the layer 710 and the layer 720 or between the layer 710 and the layer 715. The layers 710, 715 may be the same or may be different. Further, the layers 710,

715 may comprise the same materials but have a different thickness. In some examples, the layers 710, 715 may comprise the same materials but in different amounts, e.g., more fibers can be present in one of the layers 710, 715.

Figure 8:
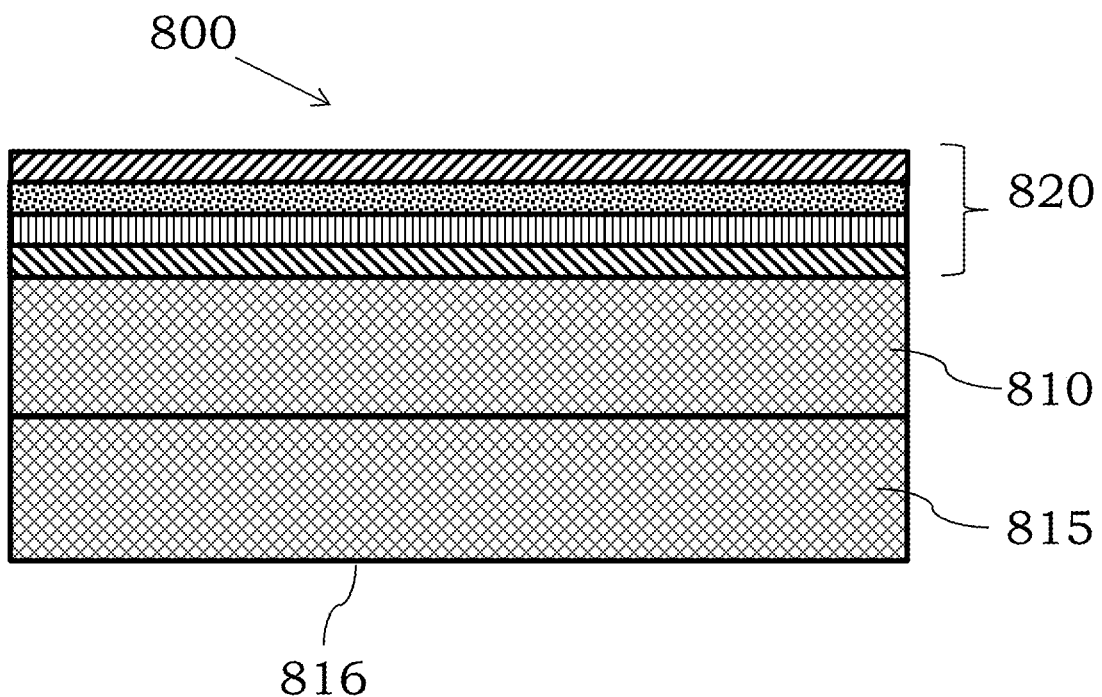
FIG. 8 is an illustration of a composite article comprising two prepreg or core layers coupled to and a textured tetra-layer film, in accordance with some examples.

In some examples, an article with stacked prepreg or core layers may comprise a tetra-layer film. Referring to FIG. 8, an article comprises a first prepreg or core layer 810 stacked on a second prepreg or core layer 815. A tetra-layer textured film 820 is disposed on a surface of the layer 810. The tetra-layer textured film 820 may be configured, for example, similar to the film 420. While not shown, a skin layer can be disposed on surface 816 of the layer 815. For example, the layer disposed on the surface 816 may be the same as the film layer 820 or may be different. The layer disposed on the surface 816 may comprise, for example, a scrim (e.g., fiber based scrim), a foil, a woven fabric, a non-woven fabric or be present as an inorganic coating, an organic coating, or a thermoset coating disposed on the prepreg or core layer 815. In other instances, the layer disposed on the surface 816 may comprise a limiting oxygen index greater than about 22, as measured per ISO 4589 dated 1996. Where a fiber based scrim is present as (or as part of) the layer disposed on the surface 816, the fiber based scrim may comprise at least one of glass fibers, aramid fibers, graphite fibers, carbon fibers, inorganic mineral fibers, metal fibers, metalized synthetic fibers, and metalized inorganic fibers. Where a thermoset coating is present as (or as part of) the layer disposed on the surface 816, the coating may comprise at least one of unsaturated polyurethanes, vinyl esters, phenolics and epoxies. Where an inorganic coating is present as (or as part of) the layer disposed on the surface 816, the inorganic coating may comprise minerals containing cations selected from Ca, Mg, Ba, Si, Zn, Ti and Al or may comprise at least one of gypsum, calcium carbonate and mortar. Where a non-woven fabric is present as (or as part of) the layer disposed on the surface 816, the non-woven fabric may comprise a thermoplastic material, a thermal setting binder, inorganic fibers, metal fibers, metallized inorganic fibers and metallized synthetic fibers. If desired, an intermediate layer (not shown) can be present between the layer 810 and the layer 820 or between the layer 810 and the layer 815. The layers 810, 815 may be the same or may be different. Further, the layers 810, 815 may comprise the same materials but have a different thickness. In some examples, the layers 810, 815 may comprise the same materials but in different amounts, e.g., more fibers can be present in one of the layers 810, 815.

While not shown, articles comprising stacked or coupled pre-preg or core layers may also comprise films with five, six, seven or more film layers.

Additional layers such as decorative layers, textured layers, colored layers and the like may also be present in the composite articles described herein. For example, a decorative layer may be formed, e.g., from a thermoplastic film of polyvinyl chloride, polyolefins, thermoplastic polyesters, thermoplastic elastomers, or the like. The decorative layer may also be a multi-layered structure that includes a foam core formed from, e.g., polypropylene, polyethylene, polyvinyl chloride, polyurethane, and the like. A fabric may be bonded to the foam core, such as woven fabrics made from natural and synthetic fibers, organic fiber non-woven fabric after needle punching or the like, raised fabric, knitted goods, flocked fabric, or other such materials. The fabric may also be bonded to the foam core with a thermoplastic adhesive, including pressure sensitive adhesives and hot melt adhesives, such as polyamides, modified polyolefins, urethanes and polyolefins. The decorative layer may also be produced using spunbond, thermal bonded, spun lace, meltblown, wet-laid, and/or dry-laid processes. Insulation layers may also be bonded to one or more surfaces of the articles described herein, and the insulation layers may be open or closed, e.g., an open cell foam or a closed cell foam, as desired.

Figure 9:
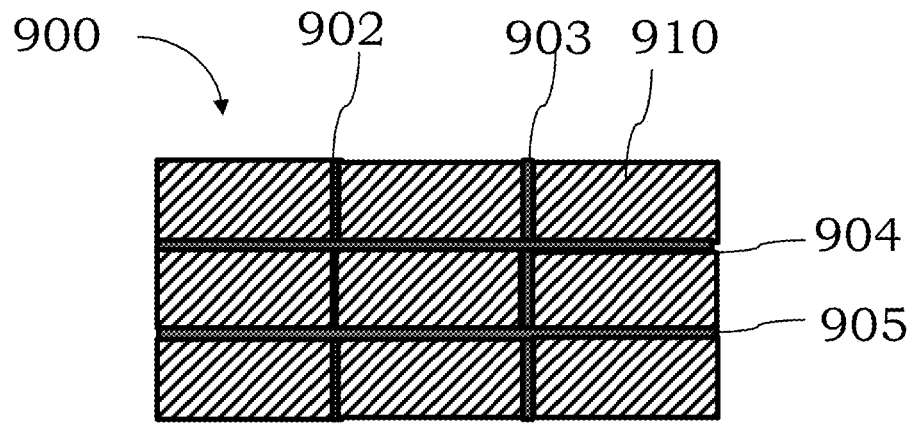
FIG. 9 is an illustration of a ceiling tile grid, in accordance with some examples.

In certain embodiments, any one or more of the articles described herein, e.g., those described in reference to FIGS. 1A-8, can be configured as a ceiling tile. For example, the ceiling tile may comprise a textured surface from the presence of a textured film. Referring to FIG. 9, a grid of ceiling tiles 900 is shown that comprises support structures 902, 903, 904 and 905 with a plurality of ceiling tiles, such as tile 910, laid into the grid formed by the support structures. As noted herein, the textured film may provide a surface texture to the ceiling tile. In some instances, the ceiling tile 910 comprises a core layer coupled to a single layer texture film. In other instances, the ceiling tile 910 comprises a core layer coupled to a bi-layer textured film. In some examples, the ceiling tile 910 comprises a core layer coupled to a tri-layer textured film. In some embodiments, the ceiling tile 910 comprises a core layer coupled to a tetra-layer textured film. Ceiling tiles with five, six, seven or more layer films may also be produced.

Figure 10:
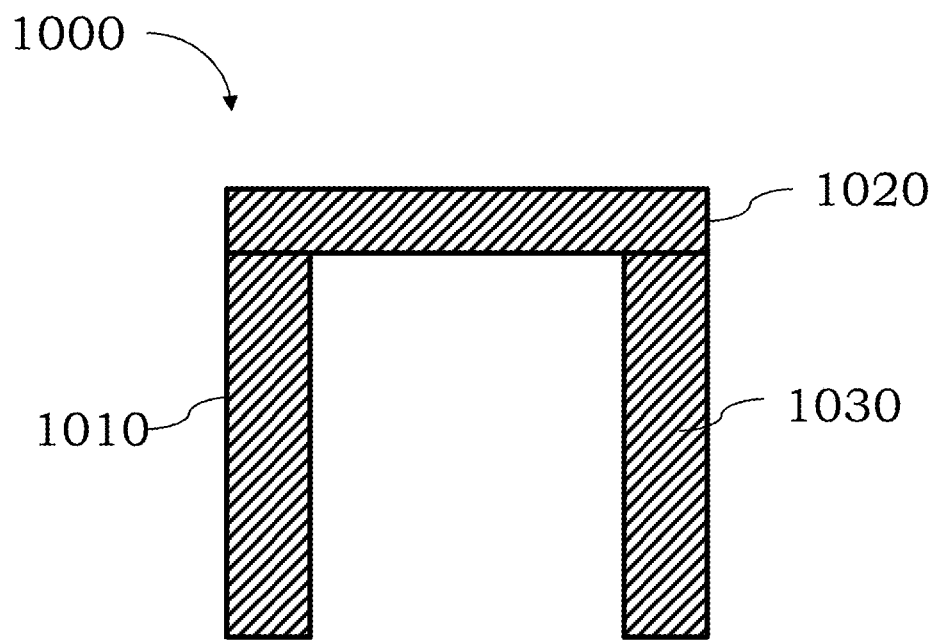
FIG. 10 is an illustration of a cubicle panel, in accordance with some examples.

In certain examples, any one or more of the articles described herein, e.g., those described in reference to FIGS. 1A-8, can be configured as a cubicle panel. Referring to FIG. 10, a top view of a cubicle 1000 comprising side panels 1010, 1030 and center panel 1030 are shown. Any one or more of the panels 1010-1030 may comprise one of the LWRT articles described herein, e.g., one comprising a textured film. In some instances, a cubicle panel comprises a core layer coupled to a single layer texture film. In other instances, the cubicle panel comprises a core layer coupled to a bi-layer textured film. In some examples, the cubicle panel comprises a core layer coupled to a tri-layer textured film. In some embodiments, the cubicle panel comprises a core layer coupled to a tetra-layer textured film. Cubicle panels with five, six, seven or more layer films may also be produced.

Figure 11:
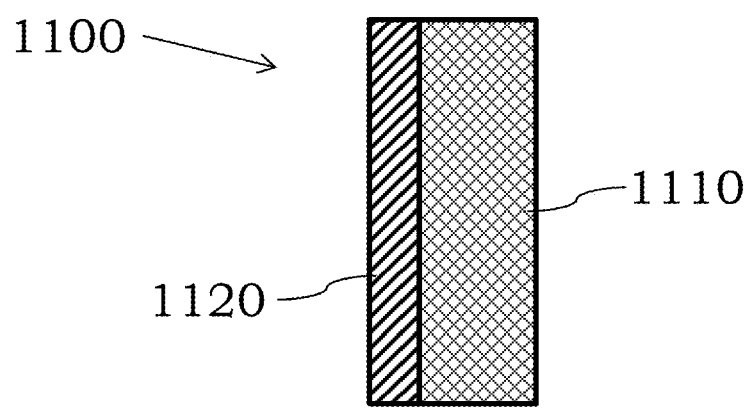
FIG. 11 is an illustration of a wall panel, in accordance with some examples.

In certain instances, any one or more of the articles described herein, e.g., those described in reference to FIGS. 1A-8, can be configured as a wall board or wall panel. The wall board or wall panel can be configured for use in domestic and commercial building applications, e.g., to cover studs or structural members in a building, to cover ceiling joists or trusses and the like or can be used in automotive applications, e.g., as recreational vehicle panels, ceilings, flooring, etc. If desired, the wall panel can be coupled to another substrate such as, for example, tile, wood paneling, gypsum, concrete backer board, foam or other wall panel substrates commonly used in residential, commercial and automotive settings. Referring to FIG. 11, a side view of a wall panel 1100 is shown. The panel 1100 may comprise any one of the LWRT articles described herein. In some instances, the wall panel 1100 comprises a porous core layer 1110 comprising a web of open celled structures comprising a random arrangement of a plurality of reinforcing fibers held together by a thermoplastic material, and a textured film layer 1120 disposed on the core layer 1110. While not shown the core layer 1110 can be coupled to an underlying substrate or other material. In some instances, a wall panel comprises a core layer coupled to a single layer texture film. In other instances, the wall panel comprises a core layer coupled to a bi-layer textured film. In some examples, the wall panel comprises a core layer coupled to a tri-layer textured film. In some embodiments, the wall panel comprises a core layer coupled to a tetra-layer textured film. Wall panels with five, six, seven or more layer films may also be produced.

Figure 12:
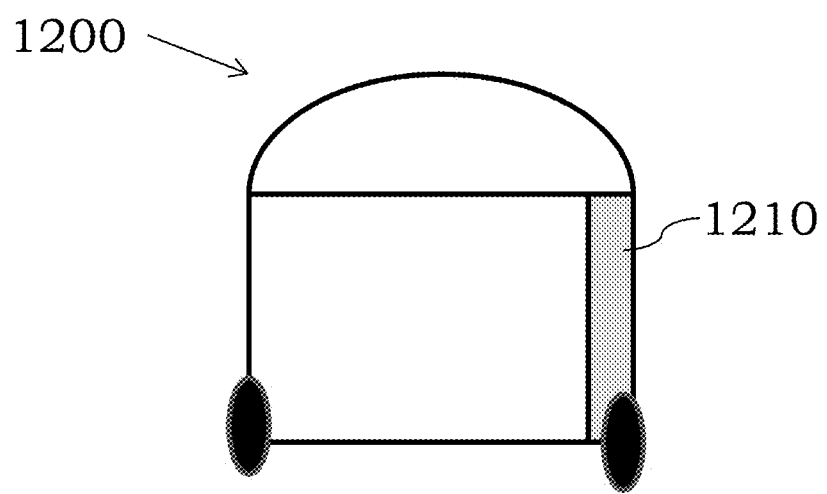
FIG. 12 is an illustration of a recreational vehicle interior panel, in accordance with some embodiments.

In certain configurations, any one or more of the articles described herein, e.g., those described in reference to FIGS. 1A-8, can be configured as an interior panel or wall of a utility trailer or recreational vehicle (RV). The panel or wall can be used, for example, to cover a skeleton structure on an interior side of the trailer or recreational vehicle and may be coupled to foam or other insulation materials between the interior and exterior sides of the trailer or the recreational vehicle. If desired, the trailer or RV interior panel can be coupled to another substrate such as, for example, a fabric, plastic, tile, etc. Referring to FIG. 12, a side view of a recreational vehicle 1200 is shown. The interior panel 1210 may comprise any one of the LWRT articles described herein. In some instances, the interior panel 1210 comprises a core layer coupled to a single layer texture film. In other instances, the interior panel 1210 comprises a core layer coupled to a bi-layer textured film. In some examples, the interior panel 1210 comprises a core layer coupled to a tri-layer textured film. In some embodiments, the interior panel 1210 comprises a core layer coupled to a tetra-layer textured film. Interior panels with five, six, seven or more layer films may also be produced.

Figure 13:
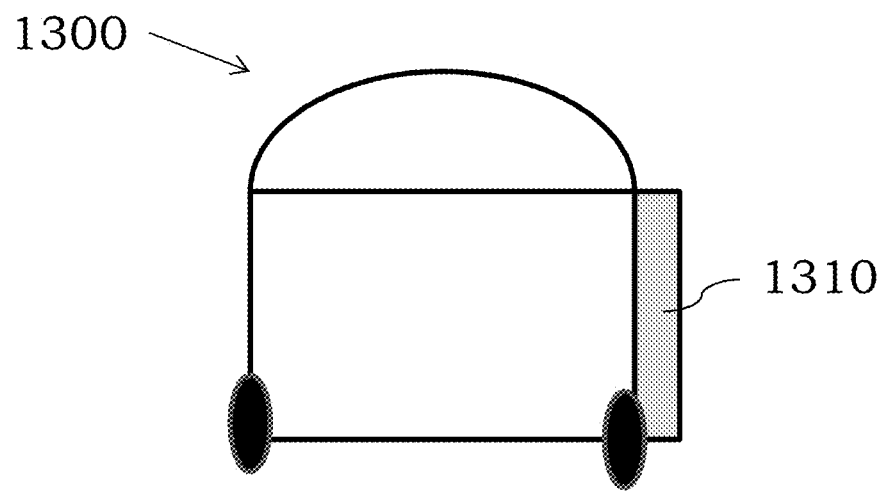
FIG. 13 is an illustration of a recreational vehicle exterior panel, in accordance with some embodiments.

In certain configurations, any one or more of the articles described herein, e.g., those described in reference to FIGS. 1A-8, can be configured as an exterior panel or wall of a recreational vehicle (RV) to absorb sound and to provide flame retardancy. The panel or wall can be used, for example, to cover a skeleton structure on an exterior side of the recreational vehicle and may be coupled to foam or other insulation materials between the interior and exterior of the recreational vehicle. If desired, the RV exterior panel can be coupled to another substrate such as, for example, a metal, fiberglass, etc. Referring to FIG. 13, a side view of a recreational vehicle 1300 is shown that comprises an exterior panel 1310, which can be configured as any one of the LWRT articles described herein. If desired, the panel 1310 can be coupled to an interior panel, e.g., panel 1210. In some instances, the exterior panel 1310 comprises a core layer coupled to a single layer texture film. In other instances, the exterior panel 1310 comprises a core layer coupled to a bi-layer textured film. In some examples, the exterior panel 1310 comprises a core layer coupled to a tri-layer textured film. In some embodiments, the exterior panel 1310 comprises a core layer coupled to a tetra-layer textured film. Interior panels with five, six, seven or more layer films may also be produced.

In some embodiments, a recreational vehicle interior panel comprises a core layer comprising a front surface and a back surface, the core layer comprising a web of reinforcing fibers held together by a thermoplastic material. The interior panel may also comprise a multi-layer film disposed on the front surface of the core layer, wherein a textured film layer of the multi-layer film is positioned on an interior surface of the front surface of the core layer and toward an interior volume of the recreational vehicle.

In some examples, the core layer of the interior panel comprises 20% to 80% by weight reinforcing fibers and 20% to 80% by weight thermoplastic material. In some examples, the reinforcing fibers comprise glass fibers and the thermoplastic material comprises a polyolefin. In certain examples, the multi-layer film comprises a polyolefin film layer under the textured film layer. In other examples, the interior surface of the recreational vehicle interior panel comprises a surface roughness less than 12 microns in the machine direction and less than 15 microns in the cross direction as measured using a stylus profilometer. Even though the surface roughness may be below certain values, it can be greater than zero to provide some texture on the surface. In some examples, the interior surface of the recreational vehicle interior panel comprises a RMS roughness less than of 15 microns in the machine direction and less than 15 microns in the cross direction. Even though the RMS surface roughness may be below certain values, it can be greater than zero to provide some texture on the surface. In other examples, the interior surface of the recreational vehicle interior panel comprises a maximum roughness of less than 90 microns in the machine direction and less than 120 microns in the cross direction. Even though the maximum surface roughness may be below certain values, it can be greater than zero to provide some texture on the surface. In certain embodiments, the interior surface of the recreational vehicle interior panel comprises a surface roughness less than 8 microns in the machine direction and less than 8 microns in the cross direction as tested using a stylus profilometer, a RMS roughness less than 10 microns in the machine direction and less than 9 microns in the cross direction and a maximum roughness less than 55 microns in the machine direction and 50 microns in the cross direction.

In some embodiments, the film of the recreational vehicle panel may comprise a thickness of the multilayer film is between 0.1 mm and 0.2 mm. In some instances, the multilayer film comprises a tie layer between the textured film layer and an adhesive layer. In other configurations, the core layer comprises a scrim disposed on the back surface. While the exact basis weight of the RV interior panel may vary, in some instances the RV interior panel comprises a basis weight of less than 1200 grams per square meter (gsm). Similarly, the overall thickness of the RV interior panel may vary, e.g., the RV interior panel may comprise a thickness of less than 4 mm. In some embodiments, the core layer comprises reinforcing glass fibers and polypropylene thermoplastic material and optionally an inorganic flame retardant material, and the multi-layer film comprises a tie layer between the textured film layer and an underlying layer. In some examples, the textured film layer may comprise a filler or be filler free. Where the multi-layer film comprises an adhesive as a layer, the adhesive comprises a hot-melt adhesive with a melting temperature of about 90-150 degrees C. In some instances, the RV interior panel is cellulose free.

In certain embodiments, the multi-layered textured films described herein can be used in or as a recreational vehicle ceiling tile. For examples, the RV ceiling tile may comprise a core layer comprising a front surface and a back surface, the core layer comprising a web of reinforcing fibers held together by a thermoplastic material. The RV ceiling tile may also comprise a multi-layer film disposed on the front surface of the core layer, wherein a textured film layer of the multi-layer film is positioned on an interior surface of the front surface of the core layer and toward an interior volume of the recreational vehicle. The multi-layer film may further comprise an adhesive layer positioned on the front surface and a tie layer between the textured film layer and the adhesive layer. In some instances, the core layer of the RV ceiling tile comprises 20% to 80% by weight reinforcing fibers and 20% to 80% by weight thermoplastic material. In other instances, the reinforcing fibers comprises glass fibers and the thermoplastic material comprises a polyolefin. In certain configurations, the multi-layer film comprises a polyolefin film layer under the textured film layer.

In some examples, the interior surface of the recreational vehicle ceiling tile comprises a surface roughness less than 12 microns in the machine direction and less than 15 microns in the cross direction as tested using a stylus profilometer. Even though the surface roughness may be below certain values, it can be greater than zero to provide some texture on the surface. In some examples, the interior surface of the recreational vehicle ceiling tile comprises a RMS roughness less than of 15 microns in the machine direction and less than 15 microns in the cross direction. Even though the RMS roughness may be below certain values, it can be greater than zero to provide some texture on the surface. In other examples, the interior surface of the recreational vehicle ceiling tile comprises a maximum roughness of less than 90 microns in the machine direction and less than 120 microns in the cross direction. Even though the maximum roughness may be below certain values, it can be greater than zero to provide some texture on the surface. In one configurations, the interior surface of the recreational vehicle ceiling tile comprises a surface roughness less than 8 microns in the machine direction and less than 8 microns in the cross direction as tested using a stylus profilometer, a RMS roughness less than 10 microns in the machine direction and less than 9 microns in the cross direction and a maximum roughness less than 55 microns in the machine direction and 50 microns in the cross direction.

In some examples, a thickness of the multilayer film of the RV ceiling tile is between 0.1 mm and 0.2 mm. In additional examples, the core layer comprises a scrim disposed on the back surface. In some examples, the core layer comprises reinforcing glass fibers and polypropylene thermoplastic material and optionally an inorganic flame retardant material. In some configurations, the textured film layer comprises a polyolefin and a filler. In some embodiments, the adhesive layer of the multi-layer film may comprise or be configured as a hot-melt adhesive with a melting temperature of 90-150 degrees C. In some examples, the ceiling tile is cellulose free.

In other configurations, the textured films described herein can be used in non-RV automotive applications including automotive panels, underbody shields, headliners, load floors and the like. For example, an interior automotive panel configured to couple to an interior side of an automotive chassis may comprise a textured film. The interior automotive panel comprises a core layer comprising a web of reinforcing fibers held together by a thermoplastic material, the panel further comprising a textured multi-layer film disposed on the core layer, wherein a textured layer of the textured multi-layer film is positioned toward an interior surface, and wherein the textured multi-layer film reduces a surface roughness of the interior automotive panel compared to a surface roughness in an absence of the textured multi-layer film. For example, the presence of the multi-layer film may decrease surface roughness (as compared to a surface roughness of the core layer) by 10%, 20%, 30%, 40% or even 50% or more.

Figure 14:
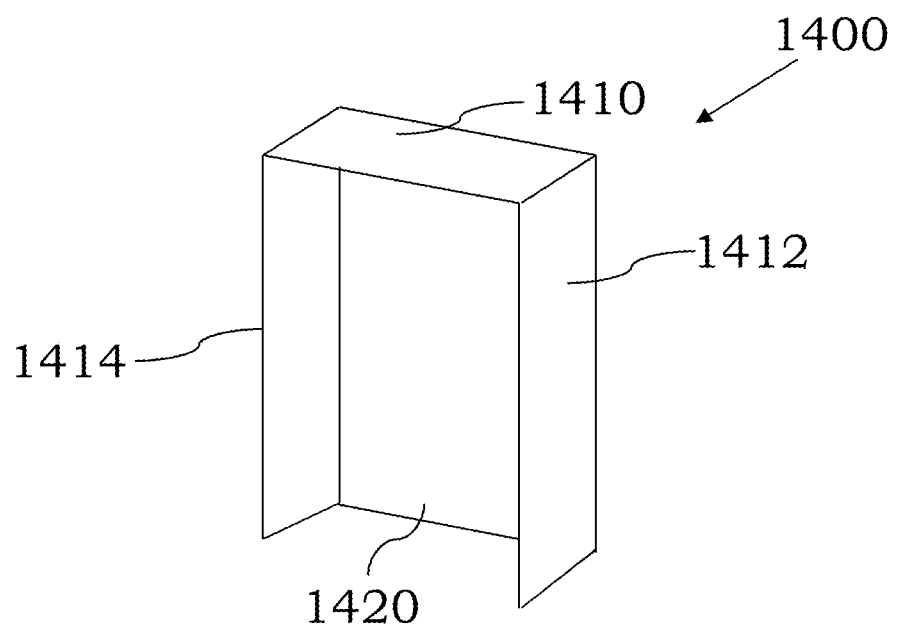
FIG. 14 is an illustration of a furniture cabinet, in accordance with some configurations.

In certain instances, the textured films described herein can be used in non-automotive or non-RV articles such as furniture. For example and referring to FIG. 14, a display cabinet 1400 is shown that comprises a top surface 1410, side surfaces 1412, 1414 coupled to the front surface 1410 and a back surface 1420 coupled to the side surfaces 1412, 1414. The surfaces 1410, 1412, 1414, and 1420 together form a user accessible interior storage area. While not shown the cabinet 1400 may comprise a front surface, e.g., a glass surface or other materials to view the contents of the cabinet. Alternatively, a door or other device can be attached to the cabinet 1400 to shield the contents within the cabinet 1400 from view. One or more surfaces of the cabinet 1400 may be configured as a composite article comprising a pre-preg or core layer and a textured film layer coupled to the pre-preg or core layer. In some examples, the back surface 1420 may comprise a core layer comprising a web of reinforcing fibers held together by a thermoplastic material and a multi-layer film disposed on the core layer, wherein a textured film layer of the multi-layer film is positioned on an exterior surface of the back surface 1420 of the furniture article 1400. Where more than one of the surfaces of the article 1400 comprises a textured film layer, the textured film layers need not have the same composition, thickness or number of layers.

In some examples, the core layer of the furniture article 1400 may comprise 20% to 80% by weight reinforcing fibers and 20% to 80% by weight thermoplastic material. In other embodiments, the reinforcing fibers comprise glass fibers and the thermoplastic material comprises a polyolefin. In some configurations, the multi-layer film of the furniture article 1400 comprises a polyolefin film layer under the textured film layer. In other instances, the exterior surface of the back surface 1420 comprises a surface roughness of less than 12 microns in the machine direction and less than 17 microns in the cross direction as tested using a stylus profilometer. Even though the surface roughness may be below certain values, it can be greater than zero to provide some texture on the surface. In another configuration, the exterior surface of the back surface 1420 comprises a RMS roughness of less than 15 microns in the machine direction and less than 20 microns in the cross direction. Even though the RMS roughness may be below certain values, it can be greater than zero to provide some texture on the surface. In certain configurations, the exterior surface of the back surface 1420 comprises a maximum roughness of at less than 90 microns in the machine direction and less than 125 microns in the cross direction. Even though the maximum roughness may be below certain values, it can be greater than zero to provide some texture on the surface. In some examples, the exterior surface of the back surface 1420 comprises a surface energy of less than 30 mN/m. In certain examples, a thickness of the multilayer film of the furniture article 1400 is between 0.1 mm and 0.2 mm. In certain configurations, the multilayer film of the furniture article comprises a tie layer between the textured film layer and an adhesive layer.

Figure 15:
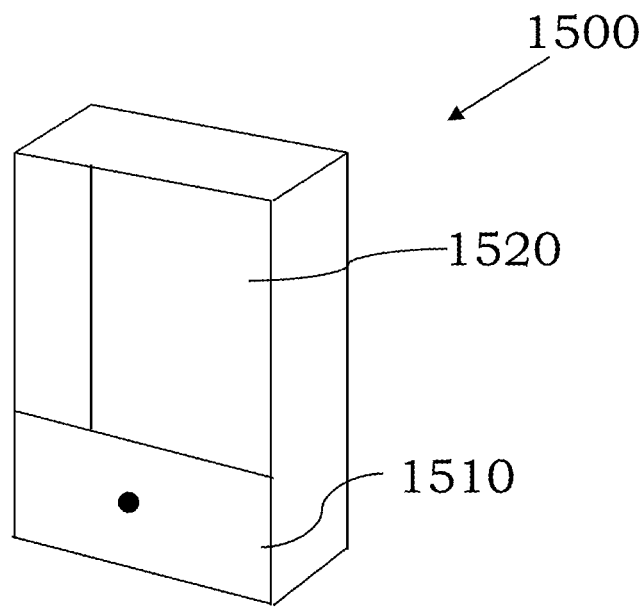
FIG. 15 is an illustration of a furniture cabinet with a drawer, in accordance with some configurations.
Figure 16A:
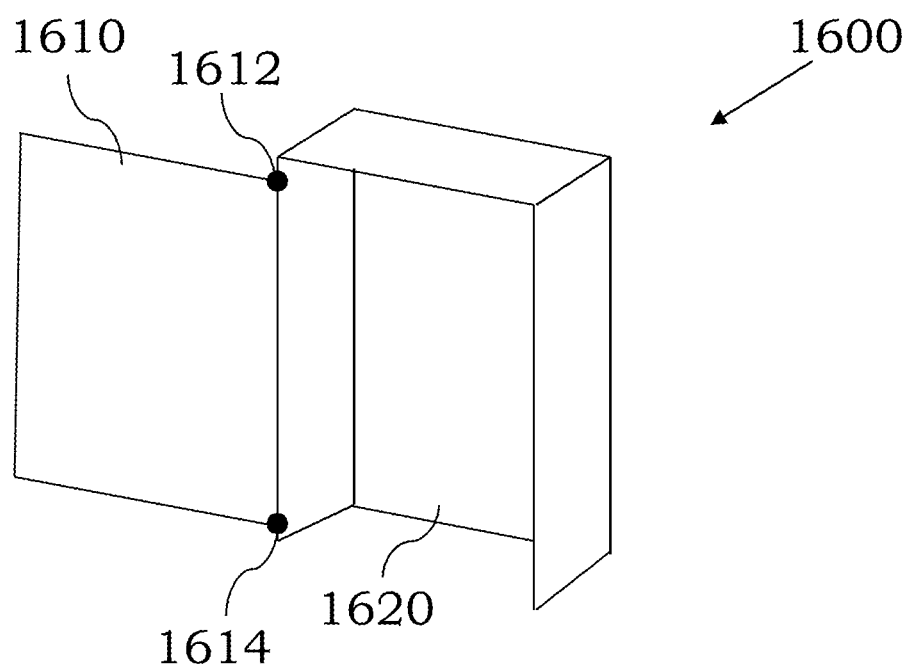
FIG. 16A is an illustration of a furniture cabinet with a door, in accordance with some configurations.
Figure 16B:
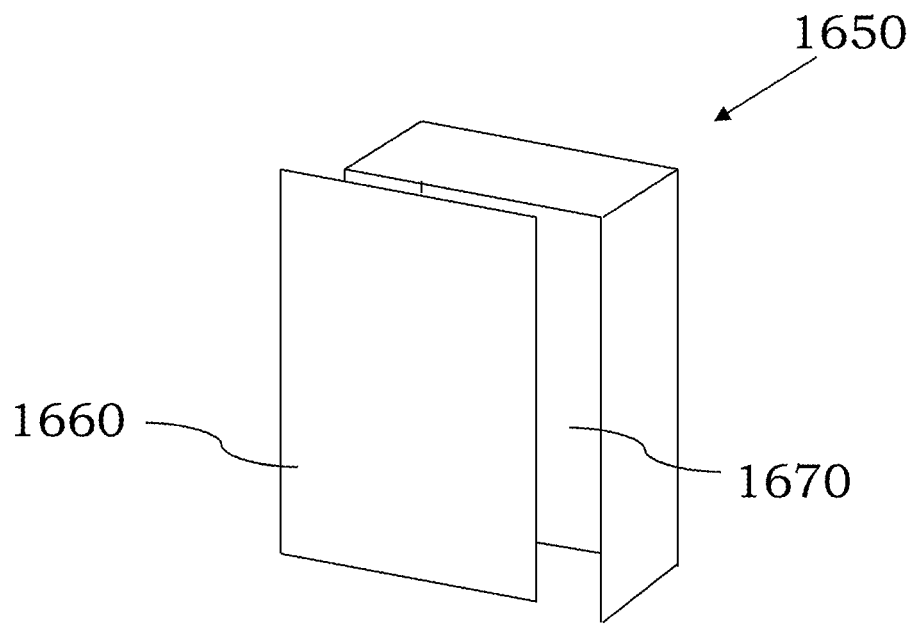
FIG. 16B is an illustration of a furniture cabinet with a sliding door, in accordance with some configurations.

In some configurations, the furniture article can be configured to receive at least one drawer. For example and referring to FIG. 15, a cabinet 1500 is shown as comprising a drawer 1510 and a back surface 1520. The back surface 1520, for example, may comprise a composite article as described herein. Other surfaces of the cabinet 1500 may also comprise a textured film and/or a composite article comprising a textured film as described herein. In other configurations, the furniture article can be configured to receive (or may comprise) at least one door. Referring to FIG. 16A, a cabinet 1600 comprises a door 1610 and a back surface. The back surface 1620, for example, may comprise a composite article as described herein. Other surfaces of the cabinet 1600 may also comprise a textured film and/or a composite article comprising a textured film as described herein. If desired, an outer surface of the door 1610 may comprise a textured film as described herein or may comprise a composite article with a textured film as described herein. Where the cabinet comprises a door, the door need not be a closable by way of a hinges 1612, 1614 as shown in FIG. 16A. Instead, the door could be configured as a sliding door 1660 as shown in FIG. 16B. The cabinet 1650 of FIG. 16B may comprise a textured film as described herein or may comprise a composite article with a textured film as described herein. For example, a back surface 1670 of the cabinet 1650 may comprise a textured film as described herein or may comprise a composite article with a textured film as described herein.

In some examples of a furniture article, the back surface (and/or other surface of the furniture article comprising a textured film) comprises a basis weight of less than 1600 gsm and a thickness of less than 4 mm. In some instances, the core layer of the furniture article comprises reinforcing glass fibers and polypropylene thermoplastic material, and optionally the multi-layer film comprises a tie layer between the textured film layer and an underlying layer. In other examples, the underlying layer comprises an adhesive, and the textured film layer comprises a polyolefin and a filler or may be filler-free. In some examples, the adhesive comprises a hot-melt adhesive with a melting temperature of 90-150 degrees Cs. In certain embodiments of a furniture article, the back surface is cellulose free. In some examples of a furniture article, at least one side surface comprises a second core layer comprising a web of reinforcing fibers held together by a thermoplastic material and a second multi-layer film disposed on the second core layer, wherein a textured film layer of the second multi-layer film is positioned on an exterior surface of the side surface of the furniture article.

Figure 17:
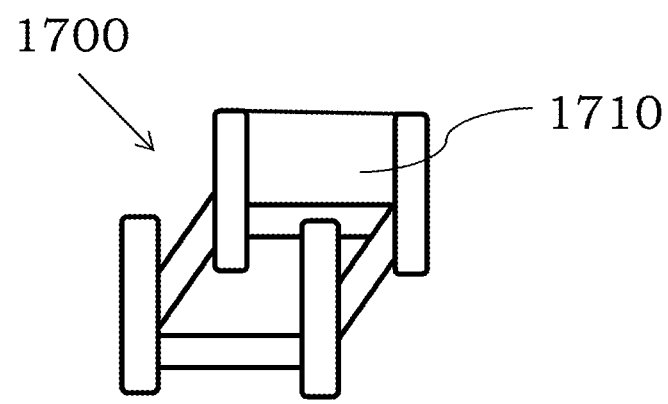
FIG. 17 is an illustration of a furniture chassis, in accordance with some configurations.

In other examples, the composite articles described herein can be used in a furniture chassis. For example, a furniture chassis may comprise a backing layer comprising a core layer comprising a web of reinforcing fibers held together by a thermoplastic material, wherein the backing layer further comprises a multi-layer film disposed on the core layer, wherein a textured film layer of the multi-layer film is positioned on an exterior surface of the backing layer. Referring to FIG. 17, a furniture chassis 1700 is shown that comprises a backing layer 1710. The exact configuration of the furniture chassis 1700 may vary depending on the end configuration of a furniture article comprising the chassis 1700. For example, the chassis 1700 can be configured as a bed frame, mattress frame, mattress support within a mattress such as a memory foam mattress, a couch frame, a chair frame, a table frame, a cabinet frame, a recliner frame, an ottoman frame, a bookshelf frame, a door frame, a window frame, a headboard frame, a desk frame, a bureau frame, or can be used in other furniture articles. In some instances, a pre-preg or core layer present in a furniture chassis comprises 20% to 80% by weight reinforcing fibers and 20% to 80% by weight thermoplastic material. In some examples, the reinforcing fibers of the pre-preg or core layer comprise glass fibers and the thermoplastic material of the pre-preg or core layer comprises a polyolefin. In some embodiments, the multi-layer film present in a furniture chassis comprises a polyolefin film layer under the textured film layer.

In some configurations, an exterior surface of the backing layer comprises a surface roughness of less than 12 microns in the machine direction and less than 17 microns in the cross direction as tested using a stylus profilometer. Even though the surface roughness may be below certain values, it can be greater than zero to provide some texture on the surface. In some examples, the exterior surface of the backing layer comprises a RMS roughness of less than 15 microns in the machine direction and less than 20 microns in the cross direction. Even though the RMS roughness may be below certain values, it can be greater than zero to provide some texture on the surface. In some instances, the exterior surface of the backing layer comprises a maximum roughness of at less than 90 microns in the machine direction and less than 125 microns in the cross direction. Even though the maximum roughness may be below certain values, it can be greater than zero to provide some texture on the surface. In some examples, the exterior surface of the backing layer comprises a surface energy of less than 30 mN/m. In other examples, a thickness of the multilayer film is between 0.1 mm and 0.2 mm. In certain embodiments, the multilayer film comprises a tie layer between the textured film layer and an adhesive layer. In certain examples, the chassis is configured to receive at least one drawer. In other examples, the chassis is configured to receive at least one door. In some embodiments, the chassis is configured to receive at least one sliding door. In some embodiments, the backing layer comprises a basis weight of less than 1600 gsm and a thickness of less than 4 mm. In certain examples, the core layer comprises reinforcing glass fibers and polypropylene thermoplastic material and optionally the multilayer film comprises a tie layer between the textured film layer and an underlying layer. In some examples, the underlying layer comprises an adhesive, and the textured film layer comprises a polyolefin and a filler or may be filler free. In some examples, the adhesive comprises a hot-melt adhesive with a melting temperature of 90-150 degrees C. In other examples, the backing layer of the furniture chassis is cellulose free. In some examples, the furniture chassis comprises at least one surface comprising a second core layer comprising a web of reinforcing fibers held together by a thermoplastic material and a second multi-layer film disposed on the second core layer, wherein a textured film layer of the second multi-layer film is positioned on an exterior surface of the side surface of the furniture article.

In certain examples, the composite articles described herein can be used in a cabinet. For example, a cabinet may comprise a front surface, sides surfaces coupled to the front surface and a back surface coupled to the side surfaces, wherein the back surface of the cabinet comprises a core layer comprising a web of reinforcing fibers held together by a thermoplastic material and a multi-layer film disposed on the core layer, wherein a textured film layer of the multi-layer film is positioned on an exterior surface of the back surface of the cabinet. If desired, the back surface of the cabinet can be cellulose free.

In some examples, the composite articles described herein can be used in a display case. For example, a display case can be configured to receive at least one fixture, wherein the display case comprises a back surface comprising a core layer comprising a web of reinforcing fibers held together by a thermoplastic material and a multi-layer film disposed on the core layer, wherein a textured film layer of the multi-layer film is positioned on an exterior surface of the back surface of the display case. In some instances, the back surface of the display case can be cellulose free.

In other configurations, a furniture article may comprise a chassis and at least one textured surface, wherein the textured surface comprises a core layer and a multi-layer film disposed on the core layer, wherein the core layer comprises reinforcing fibers and a thermoplastic material, and wherein the multi-layer film comprises a textured film layer on an exterior surface of the at least one textured surface.

In some examples, a non-automotive chassis comprises at least one textured surface, wherein the textured surface comprises a core layer and a multi-layer film disposed on the core layer, wherein the core layer comprises reinforcing fibers and a thermoplastic material, and wherein the multi-layer film comprises a textured film layer on an exterior surface of the at least one textured surface.

In certain examples, the prepreg or core of the articles described herein can be generally prepared using chopped glass fibers, a thermoplastic material, a flame retardant material and open cell films and/or woven or non-woven fabrics made with glass fibers or thermoplastic resin fibers such as, for example, polypropylene (PP), polybutylene terephthalate (PBT), polyethylene terephthalate (PET), polycarbonate (PC), a blend of PC/PBT, or a blend of PC/PET. In some embodiments, a PP, a PBT, a PET, a PC/PET blend or a PC/PBT blend are can be used as the thermoplastic material. To produce the prepreg or core, a thermoplastic material, reinforcing materials, flame retardant material(s) and/or other additives can be added or metered into a dispersing foam contained in an open top mixing tank fitted with an impeller. Without wishing to be bound by any particular theory, the presence of trapped pockets of air of the foam can assist in dispersing the glass fibers, the thermoplastic material and any flame retardant materials. In some examples, the dispersed mixture of glass and resin can be pumped to a head-box located above a wire section of a paper machine via a distribution manifold. The foam, not the glass fiber, flame retardant material or thermoplastic, can then be removed as the dispersed mixture is provided to a moving wire screen using a vacuum, continuously producing a uniform, fibrous wet web. The wet web can be passed through a dryer at a suitable temperature to reduce moisture content and to melt or soften the thermoplastic material. When the hot web exits the dryer, a surface layer such as, for example, a textured film may be laminated onto the web by passing the web of glass fiber, thermoplastic material and textured film through the nip of a set of heated rollers. If desired, additional layers such as, for example, another film layer, scrim layer, etc. may also be attached along with the textured film to one side or to both sides of the web to facilitate ease of handling the produced composite. The composite can then be passed through tension rolls and continuously cut (guillotined) into the desired size for later forming into an end composite article. Further information concerning the preparation of such composites, including suitable materials and processing conditions used in forming such composites, are described, for example, in U.S. Pat. Nos. 6,923,494, 4,978,489, 4,944,843, 4,964,935, 4,734,321, 5,053,449, 4,925,615, 5,609,966 and U.S. Patent Application Publication Nos. US 2005/0082881, US2005/0228108, US 2005/0217932, US 2005/0215698, US 2005/0164023, and US 2005/0161865.

In certain instances, a method of producing a composite article comprises combining a thermoplastic material, reinforcing fibers and optionally a flame retardant material in a mixture to form an agitated aqueous foam. The foam is disposed onto a wire support, and the water is evacuated to form a web or open cell structures comprising the thermoplastic material, fibers and optionally the flame retardant materials. In some instances, the web is then heated to a first temperature above the melting temperature of the thermoplastic material. In some instances, pressure can then be applied to the web, e.g., using nip rollers or other devices, to provide a thermoplastic composite sheet comprising the flame retardant material dispersed in the web. A textured film may then be disposed on the formed prepreg or core optionally with heating to bond the textured film to the pre-preg or core. In other instances, the textured film can be added to a formed pre-preg or core immediately prior to thermoforming to couple the textured film to the formed pre-preg or core layer.

In some examples, the various film layers of the textured film can be disposed as individual layers on a web, pre-preg or core layer. For example, individual layers that together form a textured film can be sequentially disposed on a pre-preg or core layer to provide a composite article Certain specific examples are described to illustrate further some of the novel and useful aspects of the technology described herein.

Example 1

Two different composite articles were produced as shown in Table 1 below. These composite articles can be used, for example, in RV or trailer applications such as ceiling tiles and wall panels, e.g. interior wall panels.

TABLE 1

| Sample | Core Layer | Skin (Top Surface) | Textured Film (Bottom Surface) |
|---|---|---|---|
| ST-12369 | 960 gsm, 2.7 mm thick (55% glass fibers/45% polypropylene) LWRT | 23 gsm black scrim | 3 mil white textured film (0.1 mm thick, 80 gsm) |
| ST-11978 | 960 gsm, 2.7 mm thick (25% Mg(OH)$_2$, 45% glass fibers and 30% polypropylene) | 23 gsm black scrim | 3 mil grey textured film (0.1 mm thick, 75 gsm) |

Example 2

Various mechanical properties of the test articles of Example 1 were measured. The results are shown in Tables 2-4 below. Flexural properties in the machine direction (MD) and cross direction (CD) were measured according to ASTM D790-2007.

TABLE 2

| Sample | Basis weight (gsm) | | Ash (%) | | Density (g/cm$^3$) | As produced thickness (mm) |
|---|---|---|---|---|---|---|
| | Avg. | Std. Dev. | Avg. | St. Dev. | | |
| ST-12369 | 1061.4 | 10.2 | 51.0 | 0.0 | 0.37 | 2.9 |
| ST-11978 | 1035.2 | 15.2 | 57.8 | 0.3 | 0.37 | 2.8 |

TABLE 3

| Sample | Thickness MD (mm) | Peak load MD (N) | | Slope MD (N/cm) | |
|---|---|---|---|---|---|
| | Avg. | Avg. | Std. Dev. | Avg. | St. Dev. |
| ST-12639 | 2.9 | 29.2 | 4.5 | 157.3 | 14.4 |
| ST-11978 | 2.9 | 121 | 1.4 | 100.6 | 7.6 |

TABLE 4

| Sample | Thickness CD (mm) | Peak load CD (N) | | Slope CD (N/cm) | |
|---|---|---|---|---|---|
| | Avg. | Avg. | Std. Dev. | Avg. | St. Dev. |
| ST-12639 | 2.9 | 21.5 | 2.9 | 83.5 | 12.3 |
| ST-11978 | 2.9 | 8.8 | 1.4 | 62.9 | 11.3 |

In the machine direction, ST-12369 is 22% stiffer and 29% stronger than a RV2.7 article, which comprises a 2.7mm thick LWRT (Scrim on top surface/960 gsm core/

Scrim on bottom surface) and does not have the textured film. In the cross direction, the ST-12369 article is 67% stronger and 37% stiffer than regular RV2.7.

Example 3

Surface roughness measurements of the test samples of Example 1 were performed using a stylus profilometer (Mitutoyo SJ-201). Roughness Average ($R_a$) is the arithmetic average of the absolute values of the profile heights over the evaluation length. RMS Roughness ($R_q$) is the root mean square average of the profile heights over the evaluation length. Maximum roughness ($R_t$) is the vertical distance between the highest and lowest points of the profile within the evaluation length. The results are shown in Table 5 below. $R_a$, $R_q$ & $R_t$ all decreased significantly after laminating the textured film as compared to a LWRT with a bare surface (RV 2.7. Standard deviations are shown in parentheses.

TABLE 5

| Sample | Surface Roughness MD | | | Surface Roughness CD | | |
|---|---|---|---|---|---|---|
| | $R_a$ (um) | $R_q$ (um) | $R_t$ (um) | $R_a$ (um) | $R_q$ (um) | $R_t$ (um) |
| RV2.7 bare surface | 13.63 (1.48) | 16.85 (1.85) | 100.04 (9.57) | 18.39 (0.85) | 22.59 (1.19) | 138.96 (14.83) |
| ST-12369 | 6.40 (0.79) | 7.84 (1.00) | 31.92 (4.80) | 6.82 (1.04) | 8.24 (1.24) | 31.53 (4.92) |
| ST-11978 | 7.45 (0.58) | 9.09 (0.98) | 52.10 (13.49) | 7.12 (0.83) | 8.71 (1.02) | 47.62 (9.61) |

Example 4

90-degree peeling test results (as measured according to DAN-419) were performed to test the peel strength of the textured films to the core layer. The results are shown in Table 6. The textured film could not be peeled from any of the core layers.

TABLE 6

| Samples | Environmental Aging Conditions | Peak Load MD (lbs) | | Peak Load CD (lbs) | |
|---|---|---|---|---|---|
| | | Avg. | Std. Dev. | Avg. | Std. Dev. |
| ST-12369 & ST-11978 | Ambient | Textured Film could not be peeled off from core | | | |
| | Conditioning at 88 deg. C. for 24 hours | Textured Film could not be peeled off from core | | | |
| | HOT/COLD & HIGH/LOW % REL. HUMIDITY | Textured Film could not be peeled off from core | | | |

Example 5

The surface roughness of the white textured film of Example 1 was measured using a Stylus profilometer (Mitutoyo SJ-201). As noted in Example 3, Roughness Average ($R_a$) is the arithmetic average of the absolute values of the profile heights over the evaluation length, RMS Roughness ($R_q$) is the root mean square average of the profile heights over the evaluation length, and Maximum roughness ($R_t$) is the vertical distance between the highest and lowest points of the profile within the evaluation length. The results are shown in Table 7.

TABLE 7

| Sample | Surface Roughness | | |
|---|---|---|---|
| | $R_a$ (um) | $R_q$ (um) | $R_t$ (um) |
| Textured Film (white) | 11.7 ± 0.9 | 14.0 ± 1.1 | 67.5 ± 9.5 |

Example 6

Figure 18A:
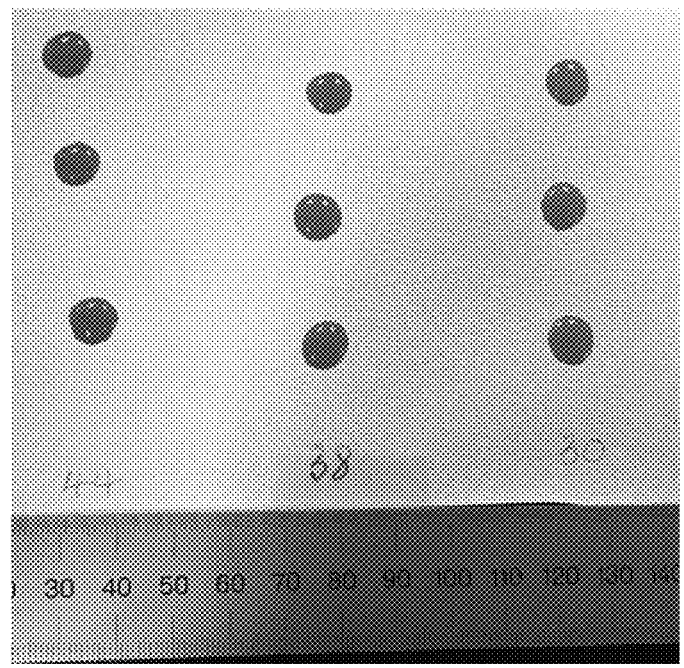
FIG. 18A is a photograph showing the addition of a dye to a textured film.
Figure 18B:
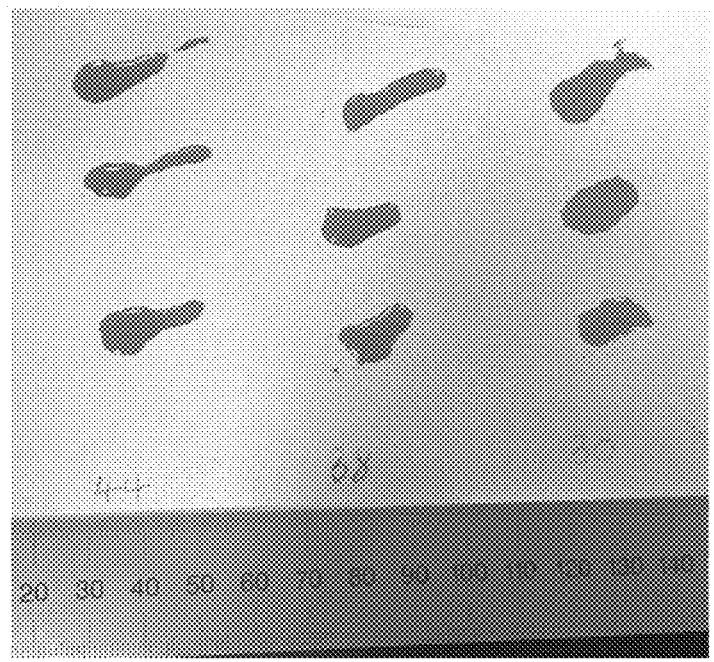
FIG. 18B is a photograph showing spreading of the added dye on the textured film.

Surface energy measurements of the white textured film were performed using a dye solution. The dye solution has a surface energy of about 30 mN/m. Photographs of the results are shown in FIGS. 18A and 18B. The dye solution could not spread and beaded up on the surface of the textured films, which is consistent with the surface energy of the film being lower than 30 mN/m.

Example 7

A composite article was produced as shown in Table 8 below. This composite article can be used, for example, in non-automotive applications such as furniture articles or chassis.

TABLE 8

| Sample | Core Layer | Skin (Top Surface) | Textured Film (Bottom Surface) |
|---|---|---|---|
| ST-12329 | 960 gsm, 2.7 mm thick (55% glass fibers/45% polypropylene) LWRT | 20 gsm black scrim | 3 mil white textured polypropylene film (0.1 mm thick, 8 gsm) |

Example 8

Various mechanical properties of the test article of Example 7 were measured. The results are shown in Tables 9-11 below. Flexural properties in the machine direction (MD) and cross direction (CD) were measured according to ASTM D790-2007.

TABLE 9

| Sample | Basis weight (gsm) | | Ash (%) | | Density (g/cm³) | As produced thickness (mm) |
|---|---|---|---|---|---|---|
| | Avg. | Std. Dev. | Avg. | St. Dev. | | |
| ST-12329 | 1040.1 | 10.5 | 51.2 | 0.0 | 0.36 | 2.9 |

TABLE 10

| Sample | Thickness MD (mm) | Peak load MD (N) | | Slope MD (N/cm) | |
|---|---|---|---|---|---|
| | Avg. | Avg. | Std. Dev. | Avg. | St. Dev. |
| RV2.7 | 3.0 | 22.7 | 4.9 | 128.7 | 20.6 |
| ST-12329 | 2.9 | 32.4 | 4.0 | 169.6 | 8.2 |

TABLE 11

| Sample | Thickness CD (mm) Avg. | Peak load CD (N) Avg. | Peak load CD (N) Std. Dev. | Slope CD (N/cm) Avg. | Slope CD (N/cm) St. Dev. |
|---|---|---|---|---|---|
| RV2.7 | 2.9 | 12.9 | 1.0 | 60.8 | 2.7 |
| ST-12329 | 2.9 | 21.9 | 2.6 | 90.7 | 10.3 |

ST-12329 is 32% stiffer and 43% stronger than a RV2.7 article, which comprises a 2.7 mm thick LWRT (Scrim on top surface/960 gsm core/Scrim on bottom surface) and does not have the textured film.

Example 9

Surface roughness measurements of the test sample of Example 7 were performed using a stylus profilometer (Mitutoyo SJ-201). Roughness Average ($R_a$) is the arithmetic average of the absolute values of the profile heights over the evaluation length. RMS Roughness ($R_q$) is the root mean square average of the profile heights over the evaluation length. Maximum roughness ($R_t$) is the vertical distance between the highest and lowest points of the profile within the evaluation length. The results are shown in Table 12 below. $R_a$, $R_q$ & $R_t$ all decreased significantly after laminating the textured film as compared to a LWRT with a bare surface (RV 2.7). Standard deviations are shown in parentheses.

TABLE 12

| Sample | Surface Roughness MD $R_a$ (um) | Surface Roughness MD $R_q$ (um) | Surface Roughness MD $R_t$ (um) | Surface Roughness CD $R_a$ (um) | Surface Roughness CD $R_q$ (um) | Surface Roughness CD $R_t$ (um) |
|---|---|---|---|---|---|---|
| RV2.7 bare surface | 13.63 (1.48) | 16.85 (1.85) | 100.04 (9.57) | 18.39 (0.85) | 22.59 (1.19) | 138.96 (14.83) |
| ST-12329 | 6.80 (0.60) | 8.29 (0.62) | 43.94 (3.68) | 6.7 (0.59) | 8.13 (0.66) | 41.72 (4.46) |

Example 10

90-degree peeling test results (as measured according to DAN-419) were performed to test the peel strength of the textured films to the core layer in the ST-12329 article. The results are shown in Table 13. The textured film could not be peeled from any of the core layers.

TABLE 13

| Samples | Environmental Aging Conditions | Peak Load MD (lbs) Avg. | Peak Load MD (lbs) Std. Dev. | Peak Load CD (lbs) Avg. | Peak Load CD (lbs) Std. Dev. |
|---|---|---|---|---|---|
| | Ambient | Textured Film could not be peeled off from core | | | |
| ST-12329 | Conditioning at 88 deg. C. for 24 hours | Textured Film could not be peeled off from core | | | |
| | HOT/COLD & HIGH/LOW % REL. HUMIDITY | Textured Film could not be peeled off from core | | | |

When introducing elements of the examples disclosed herein, the articles "a," "an," "the" and "said" are intended to mean that there are one or more of the elements. The terms "comprising," "including" and "having" are intended to be open-ended and mean that there may be additional elements other than the listed elements. It will be recognized by the person of ordinary skill in the art, given the benefit of this disclosure, that various components of the examples can be interchanged or substituted with various components in other examples.

Although certain aspects, configurations, examples and embodiments have been described above, it will be recognized by the person of ordinary skill in the art, given the benefit of this disclosure, that additions, substitutions, modifications, and alterations of the disclosed illustrative aspects, configurations, examples and embodiments are possible.

What is claimed is:

1. An interior automotive panel configured to couple to an interior side of an automotive chassis, the interior automotive panel comprising a core layer comprising a web of reinforcing fibers held together by a thermoplastic material, the interior automotive panel further comprising a textured multi-layer film disposed on the core layer, wherein a textured layer of the textured multi-layer film is positioned toward an interior surface, and wherein the textured multi-layer film reduces a surface roughness of the interior automotive panel compared to a surface roughness in an absence of the textured multi-layer film.

2. The interior automotive panel of claim 1, wherein the textured multi-layer film comprises a polyolefin film layer under the textured layer.

3. The interior automotive panel of claim 1, wherein the textured layer comprises a polyolefin and a filler.

4. fhe Interior automotive panel of claim 1, wherein the interior automotive panel is cellulose free.

5. The interior automotive panel of claim 1, wherein the interior automotive panel comprises a surface roughness less than 8 microns in the machine direction and less than 8 microns in the cross direction as tested using a stylus profilometer, a RMS roughness less than 10 microns in the machine direction and less than 9 microns in the cross direction and a maximum roughness less than 55 microns in the machine direction and 50 microns in the cross direction.

* * * * *